(12) United States Patent
Ray et al.

(10) Patent No.: US 9,467,317 B2
(45) Date of Patent: Oct. 11, 2016

(54) METHOD AND APPARATUS FOR DETECTING AND CLASSIFYING SIGNALS

(71) Applicant: The Boeing Company, Chicago, IL (US)

(72) Inventors: Gary Alan Ray, Issaquah, WA (US); James Bryan Baker, Kent, WA (US); Daniel Stewart Summers, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 16 days.

(21) Appl. No.: 14/717,589

(22) Filed: May 20, 2015

(65) Prior Publication Data

US 2015/0263872 A1 Sep. 17, 2015

Related U.S. Application Data

(62) Division of application No. 13/327,075, filed on Dec. 15, 2011, now Pat. No. 9,046,593.

(51) Int. Cl.

| | |
|---|---|
| *H04B 1/38* | (2015.01) |
| *G01S 13/00* | (2006.01) |
| *H04L 27/22* | (2006.01) |
| *G01S 7/34* | (2006.01) |
| *G01S 7/02* | (2006.01) |
| *G01S 13/34* | (2006.01) |
| *H04B 1/16* | (2006.01) |
| *G01S 5/04* | (2006.01) |

(52) U.S. Cl.
CPC ............... *H04L 27/22* (2013.01); *G01S 7/021* (2013.01); *G01S 7/023* (2013.01); *G01S 7/34* (2013.01); *G01S 13/34* (2013.01); *H04B 1/16* (2013.01); *G01S 5/04* (2013.01)

(58) Field of Classification Search
CPC .......... G01S 7/023; G01S 3/74; G01S 13/34; G01S 7/415
USPC ........................................... 375/219; 342/159
See application file for complete search history.

(56) References Cited

U.S. PATENT DOCUMENTS

| | | | |
|---|---|---|---|
| 5,221,928 A * | 6/1993 | Dahl | G01S 7/34 342/174 |
| 5,301,129 A * | 4/1994 | McKaughan | G01N 21/89 250/559.16 |

(Continued)

OTHER PUBLICATIONS

Hall et al., "On the Accuracy of Binned Kernel Density Estimators," Journal of Multivariate Analysis, vol. 56, Issue 2, Feb. 1996, pp. 165-184.

(Continued)

*Primary Examiner* — Daniel Washburn
*Assistant Examiner* — Sarah Hassan
(74) *Attorney, Agent, or Firm* — Yee & Associates, P.C.

(57) ABSTRACT

A method and apparatus for detecting signals. According to an embodiment, energy waves are received at a first receiver system and a second receiver system. The first receiver system generates first information using the energy waves received at the first receiver system. The first receiver system receives second information generated using the energy waves received at the second receiver system from the second receiver system. The first receiver system identifies desired information about a repetitive portion of a signal carried in the energy waves received at the first receiver system using the first information and the second information.

23 Claims, 24 Drawing Sheets

(56) References Cited

U.S. PATENT DOCUMENTS

| | | | |
|---|---|---|---|
| 5,440,750 A | 8/1995 | Kitai et al. | |
| 5,491,683 A | 2/1996 | Maeda et al. | |
| 5,541,960 A | 7/1996 | Satomura et al. | |
| 6,813,032 B1* | 11/2004 | Hunter | G01N 21/8903 250/559.22 |
| 7,564,404 B2 | 7/2009 | Katz | |
| 7,747,217 B1* | 6/2010 | Harvey et al. | 455/39 |
| 8,125,620 B2* | 2/2012 | Lewis | 356/5.01 |
| 9,046,593 B2 | 6/2015 | Ray et al. | |
| 2003/0028101 A1* | 2/2003 | Weisskoff | A61B 5/055 600/431 |
| 2003/0210184 A1* | 11/2003 | Apostolos | G01S 5/0018 342/192 |
| 2004/0113832 A1* | 6/2004 | Gounalis | G01S 7/021 342/13 |
| 2005/0019042 A1* | 1/2005 | Kaneda et al. | 398/208 |
| 2005/0079846 A1 | 4/2005 | Sendonaris et al. | |
| 2005/0249667 A1* | 11/2005 | Tuszynski | A61N 7/00 424/9.3 |
| 2006/0028376 A1* | 2/2006 | Theobold | G01S 7/021 342/159 |
| 2006/0184389 A1 | 8/2006 | Benja-Athon et al. | |
| 2007/0230548 A1* | 10/2007 | Van de Wiel | H04B 3/32 375/219 |
| 2008/0075185 A1 | 3/2008 | Park et al. | |
| 2009/0046565 A1 | 2/2009 | Yuzurihara et al. | |
| 2010/0283666 A1 | 11/2010 | Lee et al. | |
| 2013/0157599 A1 | 6/2013 | Ray et al. | |

OTHER PUBLICATIONS

Lindsten et al., "Geo-Referencing for UAV Navigation Using Environmental Classification," IEEE International Conference on Robotics and Automation, May 2010, pp. 1420-1425.

Ray et al., "Cooperative Detection and Classification of Repetitive Signals," Nov. 2010, pp. 1-32.

UK search and examination report dated Jul. 1, 2013 regarding applicaton GB1222640.3, reference P56347GB, applicant The Boeing Company, 7 pages.

Office Action, dated Mar. 28, 2014, regarding U.S. Appl. No. 13/327,075, 16 pages.

Final Office Action, dated Oct. 23, 2014, regarding U.S. Appl. No. 13/327,075, 8 pages.

Notice of Allowance, dated Jan. 28, 2015, regarding U.S. Appl. No. 13/327,075, 9 pages.

* cited by examiner

METHOD AND APPARATUS FOR DETECTING AND CLASSIFYING SIGNALS

This application is a divisional of application Ser. No. 13/327,075, filed Dec. 15, 2011, which is hereby incorporated by reference herein.

BACKGROUND INFORMATION

1. Field

The present disclosure relates generally to the detection and classification of repetitive signals and, in particular, to a method and apparatus for detecting and classifying repetitive signals using multiple receiver systems working cooperatively.

2. Background

A receiver system is any system configured to receive energy waves and process these energy waves to identify desired information carried in the energy waves. As used herein, an "energy wave" is a disturbance that propagates through at least one medium while carrying energy. For example, an energy wave may propagate through at least one of a liquid, a gas, plasma, a solid, a vacuum, air, space, and some other suitable type of medium. Energy waves include, but are not limited to, electromagnetic waves, radio waves, microwaves, sound waves, ultrasound waves, mechanical waves, shock waves, and/or other suitable types of energy waves.

Typically, a receiver system includes a transducer and a receiver. A transducer may be any device configured to convert one type of energy into another type of energy. The transducers used in a receiver system are typically configured to receive energy waves and convert these energy waves into an electrical signal. An antenna is one example of a transducer. A receiver processes the electrical signal generated by a transducer to obtain desired information from the electrical signal. The desired information includes information about signals carried in the energy waves.

Oftentimes, energy waves are used to carry repetitive signals. A repetitive signal is a signal that has a time period over which some aspect of the signal repeats. Repetitive signals are used in timing operations, synchronization operations, radar operations, sonar operations, and other suitable operations. For example, the characteristics of a repetitive signal may be used to synchronize two or more devices.

In some situations, a receiver system may receive energy waves carrying a repetitive signal but may be unable to identify desired information about the repetitive signal. For example, the receiver system may be unable to detect and/or classify the repetitive signal. Classifying a repetitive signal may include identifying at least one of, for example, a frequency, a pulse width, a type of modulation, a period, a phase, and/or other suitable characteristics about the repetitive signal.

A number of different factors may affect the capability of the receiver system to identify desired information about the repetitive signal. These different factors may include, for example, without limitation, a size of an antenna in the receiver system, a distance between a transmitter system that transmitted the repetitive signal and the receiver system, a signal to noise ratio (SNR) for the repetitive signal, and/or other suitable factors.

Further, while some currently available receiver systems may be capable of detecting and/or classifying repetitive signals, these receiver systems may be unable to detect and/or classify signals with a desired level of accuracy. Additionally, these receiver systems may require more processing power, resources, time, and/or effort than desired to detect and/or classify repetitive signals.

Therefore, it would be desirable to have a method and apparatus that takes into account at least some of the issues discussed above, as well as possibly other issues.

SUMMARY

In one illustrative embodiment, a method is provided for detecting and classifying a signal. A receiver in a receiver system generates information in response to receiving energy waves at the receiver system. The signal is carried in the energy waves. The receiver generates a number of stochastic histograms using the information generated. The receiver detects and classifies the signal using the number of stochastic histograms.

In another illustrative embodiment, a method is provided for detecting signals. Energy waves are received at a first receiver system and a second receiver system. The first receiver system generates first information using the energy waves received at the first receiver system. The first receiver system receives second information generated using the energy waves received at the second receiver system from the second receiver system. The first receiver system identifies desired information about a repetitive portion of a signal carried in the energy waves received at the first receiver system using the first information and the second information.

In yet another illustrative embodiment, a receiver system comprises a transducer system and a receiver. The transducer system is configured to receive energy waves and convert the received energy waves into an electrical signal. The receiver is configured to generate information using the electrical signal and generate a number of stochastic histograms using the information generated. The receiver is further configured to detect and classify the signal using the number of stochastic histograms.

In still yet another illustrative embodiment, a cooperative detection and classification system comprises a first receiver in a first receiver system and a second receiver in a second receiver system. The first receiver is configured to generate first information in response to the first receiver system receiving first energy waves. The second receiver is configured to receive the first information from the first receiver. The second receiver is further configured to generate second information in response to the second receiver system receiving second energy waves. The second energy waves include at least a portion of the first energy waves. The second receiver is configured to identify desired information about a repetitive portion of a signal carried in the second energy waves using the first information and the second information.

In still another illustrative embodiment, a cooperative classification system comprises a receiver configured to identify a first pulse train. The receiver is configured to receive a second pulse train identified by a different receiver. The receiver is configured to match the first pulse train and the second pulse train within selected tolerances.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

The different illustrative embodiments recognize and take into account different considerations. For example, the different illustrative embodiments recognize and take into account that in certain situations, currently available receiver systems may be unable to identify desired information about signals received at the receiver systems. As one specific example, a signal received at a receiver system may be weaker than desired for the receiver system to identify desired information about the signal.

The different illustrative embodiments also recognize and take into account that the transmit power of transmitter systems that transmit the signals may be limited based on at least one of legal requirements, safety requirements, physical limitations, and other types of limitations. These limitations may reduce the detection range for the signals transmitted by these transmitter systems. As used herein, the "detection range" for a signal defines the maximum distance between a transmitter system and a receiver system at which desired information about the signal can be generated by the receiver system.

Further, the different illustrative embodiments recognize and take into account that the size of antennas used in currently available receiver systems may be limited based on physical requirements and/or limitations for the receiver systems and/or the platforms on which the receiver systems are located. These limitations to the size of the antennas may reduce the detection range for signals received by the receiver systems.

The different illustrative embodiments also recognize and take into account that it may be desirable for two or more receiver systems that receive energy waves carrying a signal to exchange information generated by the receiver systems with each other. In this manner, a receiver system may use the information generated by one or more other receivers to detect a signal when the receiver system is unable to detect the signal independently.

Figure 1:
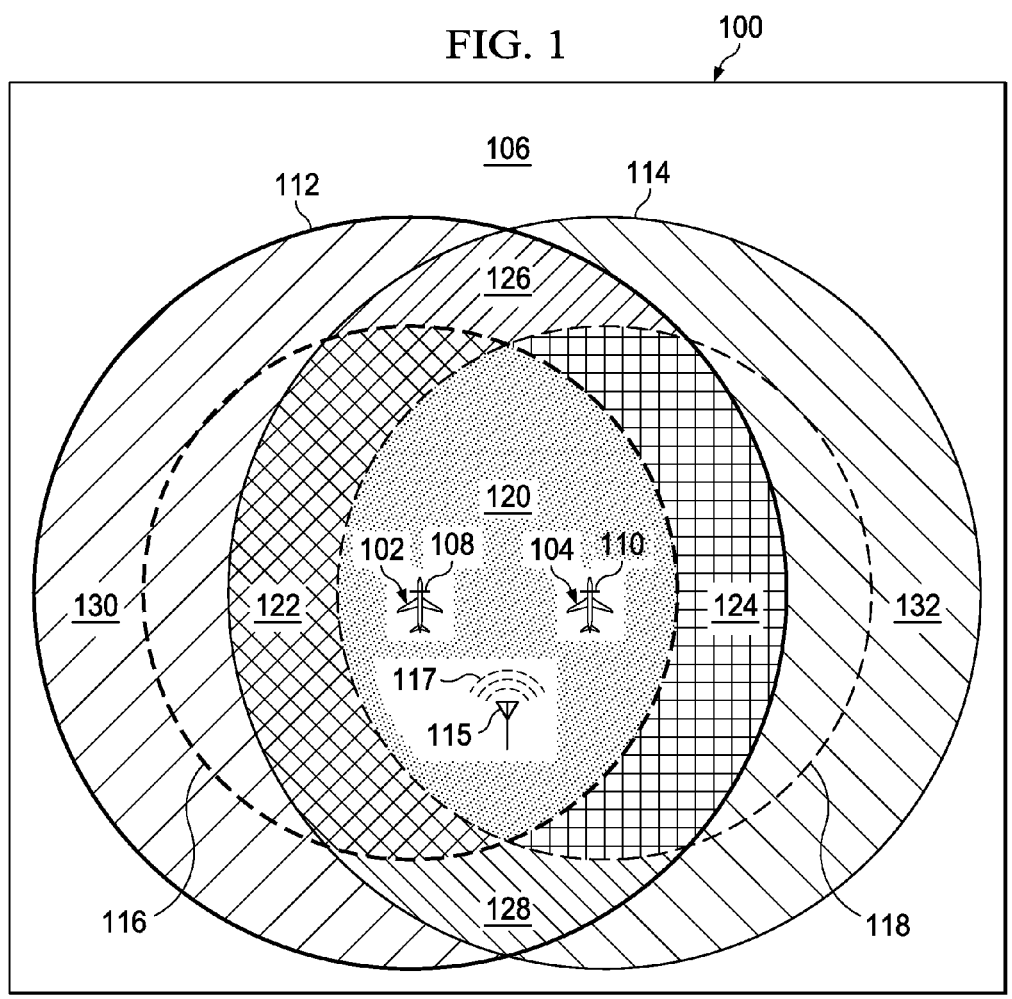
FIG. 1 is an illustration of an environment in which two receiver systems are present in which an illustrative embodiment may be implemented.

With reference now to the figures and, in particular, with reference to FIG. 1, an illustration of an environment in which two receiver systems are present is depicted in accordance with an illustrative embodiment. In this illustrative example, environment 100 includes aircraft 102 and aircraft 104 traveling through airspace 106. As depicted, aircraft 102 has receiver system 108 and aircraft 104 has receiver system 110. In this illustrative example, each of receiver system 108 and receiver system 110 has an antenna (not shown) configured to receive energy waves in the form of electromagnetic waves.

Receiver system 108 has field of view 112, and receiver system 110 has field of view 114. As used herein, the "field of view" (FOV) for a receiver system defines the directions and range with respect to the receiver system from which electromagnetic waves can be received. Receiver system 108 and receiver system 110 are unable to receive electromagnetic waves from directions outside of field of view 112 and field of view 114, respectively, and from sources outside the ranges of field of view 112 and field of view 114, respectively.

As depicted in this example, field of view 112 for receiver system 108 is about 360 degrees with respect to a horizontal plane through aircraft 102. Further, field of view 114 for receiver system 108 is about 360 degrees with respect to a horizontal plane through aircraft 104. Receiver system 108 and receiver system 110 are considered omnidirectional receiver systems capable of receiving electromagnetic waves from substantially all directions. Of course, in other illustrative examples, field of view 112 and/or field of view 114 may be less than about 360 degrees.

Field of view 112 and/or field of view 114 may change based on a number of different factors. For example, the field of view for a receiver system may change when at least one of a position, an orientation, and settings for the antenna in the receiver system changes, when at least one of the position and orientation of the aircraft on which the receiver system is located changes, and/or in response to other suitable factors.

In this illustrative example, receiver system 108 and receiver system 110 are each configured to convert electromagnetic waves that are received into a usable form. In particular, each of these receiver systems converts the electromagnetic waves received into an electrical signal that can be processed. Receiver system 108 and receiver system 110 process these electrical signals to detect and/or classify signals carried in the electromagnetic waves.

As one illustrative example, source antenna 115 is configured to transmit electromagnetic waves 117. Electromagnetic waves 117 carry a repetitive signal in this illustrative example. Detecting the repetitive signal carried in electromagnetic waves 117 includes identifying the presence of the repetitive signal. Classifying the repetitive signal carried in electromagnetic waves 117 may include identifying the repetitive signal as belonging to a particular category, being of a certain type, being transmitted from source antenna 115, and/or having some other suitable type of classification.

Detection and classification may be performed based on desired information identified about the repetitive signal. This desired information may include, for example, without limitation, at least one of values for a number of parameters for the repetitive signal, characteristics about the repetitive signal, and other suitable information. As used herein, a "number of items" means one or more items. For example, a "number of parameters" means one or more parameters.

The repetitive signal carried in electromagnetic waves 117 transmitted by source antenna 115 has detection area 116 with respect to receiver system 108 and detection area 118 with respect to receiver system 110. The detection area with respect to a receiver system is defined by the maximum distance between source antenna 115 and the receiver system at which desired information about the repetitive signal can be generated by the receiver system. This maximum distance is referred to as a detection range. When source antenna 115 is located outside of the detection area for a receiver system, such as receiver system 108 or receiver system 110, the receiver system may be unable to identify the desired information about the repetitive signal.

Detection area 116 and detection area 118 may depend on a number of different factors. For example, detection area 116 and detection area 118 may depend on the transmit power of source antenna 115, the signal to noise ratio (SNR) of the repetitive signal received at the corresponding receiver system, the size of the antenna in the corresponding receiver system, and/or other suitable factors.

In this illustrative example, regions 120, 122, 124, 126, 128, 130, and 132 correspond to different intersections of field of view 112, field of view 114, detection area 116, and detection area 118. Region 120 is the intersection of detection area 116 and detection area 118. Both receiver system 108 and receiver system 110 may be capable of detecting the repetitive signal when source antenna 115 is in a location within region 120.

Region 122 is within both field of view 112 and detection area 116 for receiver system 108 and within field of view 114 for receiver system 110. However, region 122 is outside of detection area 118 for receiver system 110. Receiver system 110 may be unable to detect the repetitive signal when source antenna 115 is in a location in region 122.

Similarly, region 124 is within both field of view 114 and detection area 118 for receiver system 110 and within field of view 112 for receiver system 108. However, region 124 is outside of detection area 116 for receiver system 108. Receiver system 108 may be unable to detect the repetitive signal when source antenna 115 is in a location in region 124.

Region 126 and region 128 are both within field of view 112 and field of view 114 but outside of detection area 116 and detection area 118. Both receiver system 108 and receiver system 110 may be able to receive the repetitive signal when source antenna 115 is in a location in region 126 or region 128 but unable to detect the repetitive signal.

Further, region 130 is within field of view 112 but outside of field of view 114. Receiver system 110 may be unable to receive the repetitive signal when source antenna 115 is in a location in region 130. Similarly, region 132 is within field of view 114 but outside of field of view 112. Receiver system 108 may be unable to detect the repetitive signal when source antenna 115 is in a location in region 132.

The different illustrative embodiments recognize and take into account that it may be desirable for receiver system 108 and receiver system 110 to work together to detect the repetitive signal. For example, the different illustrative embodiments recognize and take into account that receiver system 108 and receiver system 110 may exchange information with each other to improve the detection of the repetitive signal by each of these receiver systems.

Further, the different illustrative embodiments recognize and take into account that using both receiver system 108 and receiver system 110 to cooperatively detect signals, such as the repetitive signal, may allow a smaller sized antenna to be used in each of these receiver systems. The different illustrative embodiments recognize and take into account that the weight and cost of receiver systems used on various types of platforms, as well as the weight and cost of the platforms on which these antennas are used, may be reduced with smaller antennas as compared to larger antennas.

Thus, the different illustrative embodiments provide a method and apparatus for using multiple receiver systems to cooperatively detect and classify signals. In another illustrative embodiment, a method is provided for detecting signals. Energy waves are received at a first receiver system and a second receiver system. The first receiver system generates first information using the energy waves received at the first receiver system. The first receiver system receives second information generated using the energy waves received at the second receiver system from the second receiver system. The first receiver system identifies desired information about a repetitive portion of a signal carried in the energy waves received at the first receiver system using the first information and the second information.

In another illustrative embodiment, a method is provided for detecting and classifying a signal. A receiver in a receiver system generates information in response to receiving energy waves at the receiver system. The signal is carried in the energy waves. The receiver generates a number of stochastic histograms using the information generated. The receiver detects and classifies the signal using the number of stochastic histograms.

Figure 2:
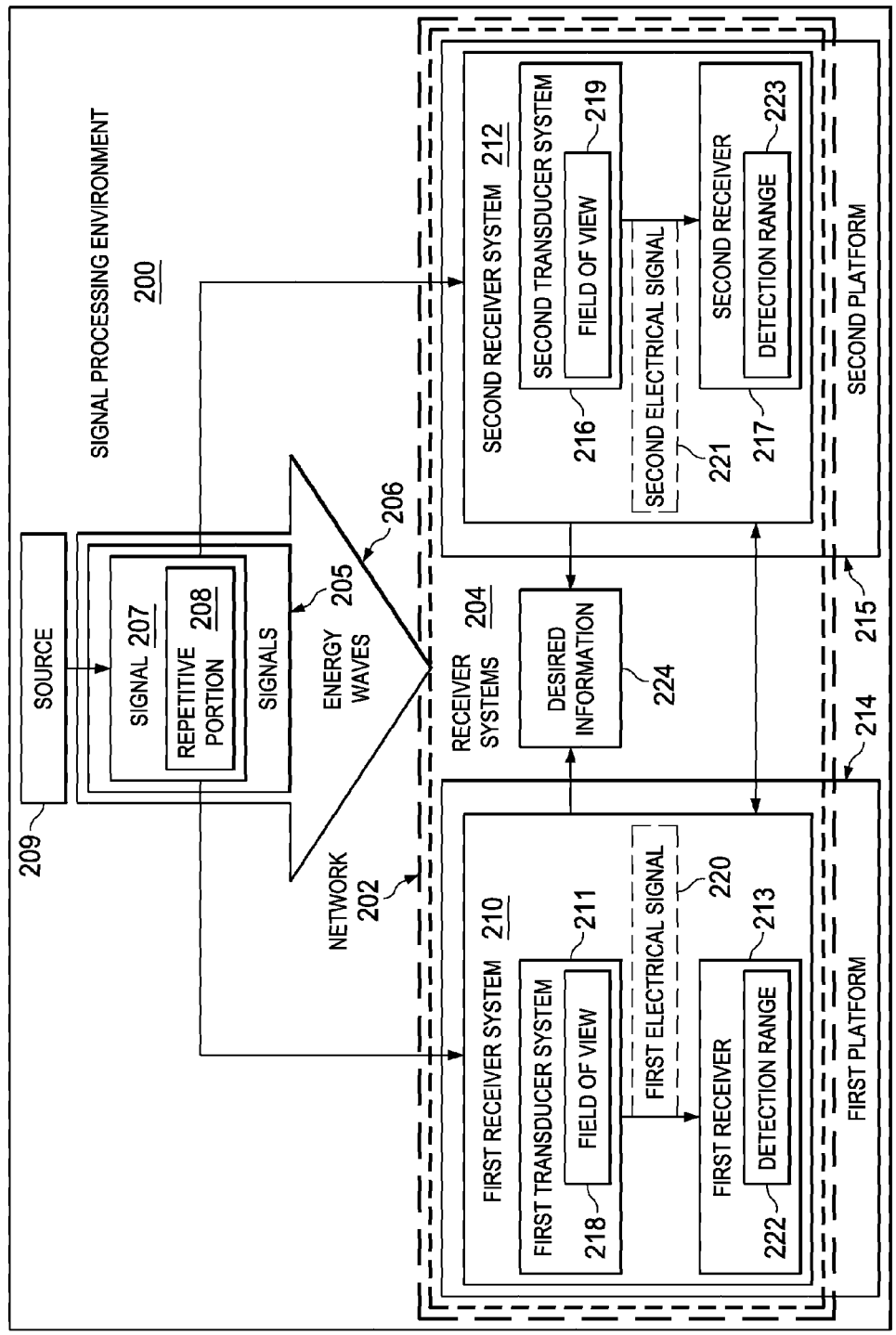
FIG. 2 is an illustration of a signal processing environment in the form of a block diagram in accordance with an illustrative embodiment.

With reference now to FIG. 2, an illustration of a signal processing environment in the form of a block diagram is depicted in accordance with an illustrative embodiment. Signal processing environment 200 includes network 202. In these illustrative examples, network 202 includes receiver systems 204 that are in communication with each other.

Receiver systems 204 are configured to receive energy waves 206. Each receiver system in receiver systems 204 may take a number of different forms. For example, without limitation, a receiver system in receiver systems 204 may be part of a system selected from one of a global positioning system (GPS), a weather radar system, a radar system, a radio system, a sonar system, and some other suitable type of system.

Energy waves 206 may carry signals 205. In these illustrative examples, signals 205 take the form of repetitive signals. A repetitive signal is a signal having a time period over which some aspect of the signal repeats. In other words, a repetitive signal is a signal in which a portion of the signal repeats. This portion may also be referred to as a repetitive portion of the signal. Signal 207 is an example of a repetitive signal in signals 205.

Signal 207 may be converted into energy waves 206 by source 209. Source 209 may include, for example, without limitation, a number of transducers, a number of antennas, a number of speakers, a number of light sources, and/or other types of sensors configured to convert signal 207 into energy waves 206 and emit energy waves 206. In this manner, energy waves 206 may carry signal 207.

Signal 207 has repetitive portion 208. Each occurrence of repetitive portion 208 in signal 207 may be referred to as a "cycle". Depending on the implementation, repetitive portion 208 of signal 207 may take a number of different forms. In one illustrative example, repetitive portion 208 may be a repetitive sequence of pulses. In other words, repetitive portion 208 may be a sequence of pulses that repeats over time in signal 207. This repetitive sequence of pulses may include one pulse, two pulses, three pulses, and/or some other number of pulses. When repetitive portion 208 is a repetitive sequence of pulses, signal 207 may be referred to as a repetitive pulsed signal.

As another illustrative example, repetitive portion 208 may be a single oscillation of a sine wave that repeats over time. When repetitive portion 208 is an oscillation of a sine wave, signal 207 may be referred to as a sinusoidal signal. Of course, in other illustrative examples, repetitive portion 208 may take some other suitable form, such as, for example, a set of waveforms that repeats over time.

In these illustrative examples, receiver systems 204 include first receiver system 210 and second receiver system 212. First receiver system 210 and second receiver system 212 are in communication with each other. In particular, first receiver system 210 and second receiver system 212 are configured to exchange information. In some illustrative examples, first receiver system 210 and second receiver system 212 may exchange information wirelessly.

First receiver system 210 and second receiver system 212 are in two different locations. For example, in this illustrative example, first receiver system 210 is associated with first platform 214, while second receiver system 212 is associated with second platform 215. Of course, in other illustrative examples, first receiver system 210 and second receiver system 212 may be associated with the same platform. For example, first receiver system 210 may be located at one end of a platform, and second receiver system 212 may be located at an opposite end of the same platform.

In these illustrative examples, the associations between first receiver system 210 and first platform 214 and between second receiver system 212 and second platform 215 are physical associations. A first component, such as first receiver system 210, may be considered to be associated with a second component, such as first platform 214, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, first platform 214 and second platform 215 may take a number of different forms. For example, first platform 214 and second platform 215 may take the form of a mobile platform, a stationary platform, a land-based structure, an aquatic-based structure, a space-based structure, a manmade structure, an aircraft, an unmanned aerial vehicle (UAV), a surface ship, a tank, a personnel carrier, a train, a spacecraft, a space station, a satellite, a submarine, an automobile, a power plant, a bridge, a dam, a manufacturing facility, a building, and/or some other suitable type of platform.

Receiver system 108 on aircraft 102 in FIG. 1 is an example of one implementation for first receiver system 210 associated with first platform 214. Receiver system 110 on aircraft 104 in FIG. 1 is an example of one implementation for second receiver system 212 on second platform 215.

In these illustrative examples, first receiver system 210 includes first transducer system 211 and first receiver 213. Second receiver system 212 includes second transducer system 216 and second receiver 217. First transducer system 211 and second transducer system 216 may each comprise a number of transducers configured to receive energy waves 206.

For example, each of first transducer system 211 and second transducer system 216 may comprise a number of antennas configured to receive energy waves 206 in the form of electromagnetic waves. In some cases, each of first transducer system 211 and second transducer system 216 may comprise a number of microphones configured to receive energy waves 206 in the form of sound waves. In these illustrative examples, first transducer system 211 has field of view 218, while second transducer system 216 has field of view 219.

First transducer system 211 and second transducer system 216 are configured to receive and convert energy waves 206 into electrical signals. For example, when energy waves 206 are within field of view 218 for first transducer system 211, first transducer system 211 receives and converts energy waves 206 into first electrical signal 220. First transducer system 211 sends first electrical signal 220 to first receiver 213 for processing.

Further, when energy waves 206 are within field of view 219 for second transducer system 216, second transducer system 216 receives and converts energy waves 206 into second electrical signal 221. Second transducer system 216 sends second electrical signal 221 to second receiver 217 for processing. In these illustrative examples, first electrical signal 220 and second electrical signal 221 may be continuous-time electrical signals.

First receiver 213 and second receiver 217 process first electrical signal 220 and second electrical signal 221, respectively, to determine whether any signals are detected in first electrical signal 220 and/or second electrical signal 221. In these illustrative examples, these receiver systems may identify desired information 224 about signal 207 to detect signal 207.

Desired information 224 may include, for example, without limitation, at least one of a time of arrival, a frequency, a pulse width, a type of modulation, a phase, and other suitable parameters for or characteristics about signal 207. Further, desired information 224 about signal 207 may include information about repetitive portion 208 of signal 207.

Signal 207 has detection range 222 with respect to first receiver system 210, while signal 207 has detection range 223 with respect to second receiver system 212. The detection range for signal 207 defines the maximum distance between source 209 and the corresponding receiver system at which desired information 224 about signal 207 can be generated by the receiver in the corresponding receiver system. This maximum distance may be defined in any number of directions with respect to the transducer system.

As one illustrative example, first transducer system 211 may receive signal 207 in the form of energy waves 206 when source 209 is located within field of view 218 for first transducer system 211. However, detection of signal 207 by first receiver 213 depends on whether source 209 is located within detection range 222 of first transducer system 211.

Of course, other factors may affect the capability of first receiver system 210 and/or second receiver system 212 to generate desired information 224 about signal 207. These factors may include, for example, without limitation, the strength of signal 207 transmitted by source 209, characteristics of source 209, characteristics of the transducer systems in the receiver systems, characteristics of the environment in which the receiver systems are located, weather conditions, wind conditions, noise, interference, and/or other suitable factors. Further, one or more of these factors may affect detection range 222 and/or detection range 223.

In these depicted examples, receiver systems 204 in network 202 may be configured to work cooperatively such that multiple receiver systems in network 202 may detect signal 207 even when source 209 is outside the detection ranges of one or more of the receiver systems. This type of detection is referred to as "cooperative detection".

In one illustrative example of cooperative detection, first receiver system 210 and second receiver system 212 both receive signal 207 transmitted by source 209. However, while source 209 is located within detection range 222 of first receiver system 210, source 209 is located within field of view 219 of second receiver system 212 but outside of detection range 223 of second receiver system 212. Consequently, first receiver 213 in first receiver system 210 is able to generate desired information 224 about signal 207, while second receiver 217 in second receiver system 212 is unable to generate desired information 224 about signal 207.

In this illustrative example, with cooperative detection, first receiver 213 sends information generated by first receiver 213 using first electrical signal 220 to second receiver 217. Second receiver 217 is configured to generate desired information 224 for signal 207 using the information received from first receiver system 210 and second electrical signal 221.

As another illustrative example, source 209 is located within field of view 218 and field of view 219 but outside of detection range 222 and detection range 223. As a result, both first receiver 213 and second receiver 217 are unable to generate desired information 224 about signal 207 without working cooperatively together. In this case, first receiver 213 and second receiver 217 may exchange information with each other such that each receiver system can detect repetitive portion 208 of signal 207.

Additionally, in these illustrative examples, the receivers in receiver systems 204 in network 202 may work cooperatively to classify signals 205 received at receiver systems 204 using desired information 224. For example, first receiver 213 and second receiver 217 may receive multiple signals 205 received at first receiver system 210 and second receiver system 212, respectively. However, first receiver 213 and/or second receiver 217 may be unable to distinguish between the different signals 205 without working cooperatively.

First receiver 213 and second receiver 217 may exchange information and use this information to determine whether a first signal detected by first receiver 213 is from the same source as a second signal detected by second receiver 217. Further, first receiver 213 and second receiver 217 may use this information to classify the first signal detected by first receiver 213 and the second signal detected by second receiver 217 based on similar characteristics for these signals. This process may be referred to as "cooperative classification".

The processing of first electrical signal 220 by first receiver 213 in first receiver system 210 and the processing of second electrical signal 221 by second receiver 217 in second receiver system 212 is described in greater detail in FIG. 3 below. In particular, cooperative detection and cooperative classification performed by first receiver 213 and second receiver 217 are described in greater detail in FIG. 3 below.

Figure 3:
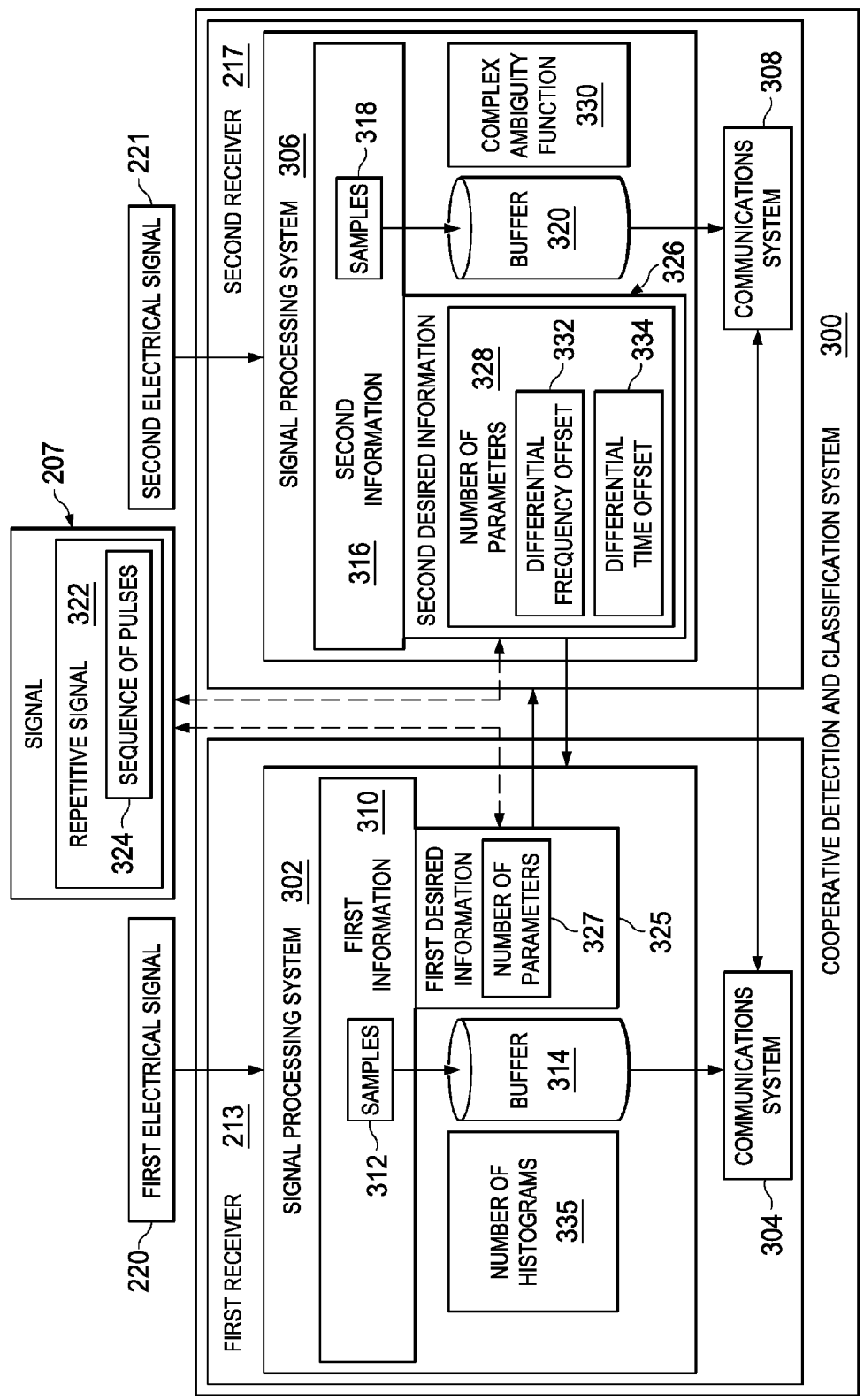
FIG. 3 is an illustration of a cooperative detection and classification system in the form of a block diagram in accordance with an illustrative embodiment.

With reference now to FIG. 3, an illustration of a cooperative detection and classification system in the form of a block diagram is depicted in accordance with an illustrative embodiment. As depicted, first receiver 213 and second receiver 217 form cooperative detection and classification system 300. First receiver 213 receives first electrical signal 220 from first transducer system 211 in FIG. 2. Further, second receiver 217 receives second electrical signal 221 from second transducer system 216 in FIG. 2.

In this illustrative example, first receiver 213 includes signal processing system 302 and communications system 304. Second receiver 217 includes signal processing system 306 and communications system 308. Signal processing system 302 in first receiver 213 and signal processing system 306 in second receiver 217 may be implemented using hardware, software, or a combination of both.

Communications system 304 in first receiver 213 allows first receiver 213 to communicate with second receiver 217 and other receiver systems in network 202 in FIG. 2. Further, communications system 308 in second receiver 217 allows second receiver 217 to communicate with first receiver 213 and other receiver systems in network 202 in FIG. 2.

Communications system 304 and communications system 308 may take a number of different forms, depending on the implementation. Each of these communication systems may take the form of, for example, without limitation, a wireless communications system, a transceiver system, a transmitter and receiver system, an optical communications system, and/or some other suitable type of communications system.

In these illustrative examples, signal processing system 302 generates first information 310 in response to receiving first electrical signal 220. As depicted, first information 310 includes samples 312 of first electrical signal 220. For example, signal processing system 302 may sample first electrical signal 220 at a selected sampling rate to generate samples 312.

More specifically, samples 312 are generated by converting first electrical signal 220 into a discrete-time signal. Each sample of samples 312 may be a value for first electrical signal 220 taken at a particular point in time. In these illustrative examples, samples 312 may be referred to as digitized intermediate frequency (IF) samples of first electrical signal 220. In some illustrative examples, further processing of first electrical signal 220 may be performed when generating samples 312.

Signal processing system 302 stores samples 312 in buffer 314. Buffer 314 may be configured to store times at which samples 312 were generated in addition to samples 312. When buffer 314 stores both samples 312 and times for samples 312, buffer 314 may take the form of a time-stamped buffer. In particular, buffer 314 may be a circular time-stamped buffer. With a circular time-stamped buffer, data may be overwritten over time to make space in the buffer.

Additionally, signal processing system 306 generates second information 316 in response to receiving second electrical signal 221. Second information 316 includes samples 318 of second electrical signal 221. In a manner similar to signal processing system 302, signal processing system 306 samples second electrical signal 221 to generate samples 318 of second electrical signal 221. In some illustrative examples, further processing of second electrical signal 221 may be performed when generating samples 318.

Signal processing system 306 stores samples 318 in buffer 320. Buffer 320, like buffer 314, may take the form of a circular time-stamped buffer in this illustrative example. When buffer 314 and buffer 320 take the form of circular buffers, these buffers are limited in the number of samples that can be stored. These limitations may impose constraints on the time interval over which cooperative detection and/or cooperative classification operations may be performed.

When source 209 is located within detection range 222 of first receiver system 210 in FIG. 2, signal processing system 302 may be able to detect signal 207 using samples 312 of first electrical signal 220. Similarly, when source 209 is located within detection range 223 of second receiver system 212 in FIG. 2, signal processing system 306 may be able to detect signal 207 using samples 318.

However, in some cases, source 209 may not be located within detection range 222 and/or detection range 223. In these instances, first receiver 213 and second receiver 217 may exchange first information 310 and second information 316, respectively, to cooperatively detect signal 207 even when source 209 is located outside of detection range 222 and/or detection range 223.

Signal processing system 302 and signal processing system 306 may exchange first information 310 and second information 316 using communications system 304. In one illustrative example, these signal processing systems may exchange information continuously as first information 310 is generated. In other examples, the signal processing systems may exchange information in response to an occurrence of a selected event. The selected event may be, for example, a period of time elapsing, a command, a selected number of samples being collected, a request received from second receiver 217, a combination of events, and/or some other suitable type of event.

In these illustrative examples, signal 207 takes the form of repetitive signal 322. In particular, repetitive signal 322 comprises sequence of pulses 324 that repeats in repetitive signal 322. Typically, signal 207 in the form of repetitive signal 322 is "on" for some period of time and then followed by being "off" for some period of time. The period of time during which signal 207 is "on" corresponds to a pulse. The duty factor of a signal is the ratio of the "on" period of time to the "off" period of time.

When first receiver 213 sends samples 312 to second receiver 217 and second receiver 217 sends samples 318 to first receiver 213, these receivers may selectively send the portions of samples 312 and samples 318 that are taken during the "on" portions of signal 207. In this manner, the amount of data that needs to be sent to and processed by first receiver 213 and second receiver 217 may be reduced as compared to these receivers processing the samples for both the "on" and "off" portions of signal 207.

In these illustrative examples, first receiver 213 may use samples 312 generated by first receiver 213 and samples 318 received from second receiver 217 to detect and classify any pulses that are carried in energy waves 206 in FIG. 2. In this illustrative example, detecting and classifying a pulse means identifying values for parameters for the pulse. The parameters identified may include, for example, without limitation, at least one of a frequency, a phase, a pulse width, a time of arrival, an angle of arrival, a type of modulation, a modulation rate, other modulation parameters, and other suitable parameters. The type of modulation may be, for example, phase-shift keying (PSK), binary phase-shift keying (BPSK), frequency-shift keying (FSK), and/or some other suitable type of modulation.

The detections and classifications of a pulse by first receiver 213 and second receiver 217 may be different. For example, the number of and/or the values for the parameters identified by these two receivers for the same pulse may be different. These differences may be caused by, for example, Doppler effects, different distances between the receivers and source 209, and/or other suitable differences.

As one illustrative example, sequence of pulses 324 in signal 207 may be a single pulse that repeats in signal 207. The pulses of signal 207 may be represented as follows:

$$\{s_j\}_{j=1,\ldots,n}, \quad (1)$$

where each pulse may be parameterized and represented in the form:

$$s_j(t)=s(t-t_j)=a(t-t_j)e^{2\pi i f(t-t_j)+\phi_j}, \text{for} \quad (2)$$

$$t_j < t < t_j+w, \text{where} \quad (3)$$

$$t_j = j*PRI+t_0, \text{and} \quad (4)$$

where j is an index for the pulses, n is a total number of pulses in, $s_j$ is a $j^{th}$ pulse, t is time, a( ) is a modulation function, i is the imaginary number that is the square root of negative one, $\pi$ is pi, f is frequency, $\phi_j$ is a phase of the $j^{th}$ pulse, $t_j$ is the time at which the $j^{th}$ pulse begins, w is pulse width, $t_0$ is a start time, and PRI is pulse repetition interval. The pulse repetition interval for signal 207 is the time between the beginning of one pulse and the beginning of the next pulse in signal 207. In some cases, the pulse repetition interval for signal 207 may be the mean time between pairs of adjacent pulses in signal 207.

In these illustrative examples, first receiver 213 may use samples 312 generated by first receiver 213 and samples 318 received from second receiver 217 to generate first desired information 325 about signal 207. Similarly, second receiver 217 may use samples 318 generated by second receiver 217 and samples 312 received from first receiver 213 to generate second desired information 326 about signal 207.

First desired information 325 and second desired information 326 include information about sequence of pulses 324 in signal 207. In particular, first desired information 325 includes values for number of parameters 327 for sequence of pulses 324, and second desired information 326 includes values for number of parameters 328 for sequence of pulses 324.

In one illustrative example, second receiver 217 correlates samples 312 received from first receiver 213 with samples 318 generated by second receiver 217 to generate second desired information 326. In particular, signal processing system 306 is configured to correlate samples 312 with samples 318 using complex ambiguity function (CAF) 330. Complex ambiguity function 330 is defined as follows:

$$\text{caf}(\tau,f) = \int_0^T s_1(t) s_2^*(t-\tau) e^{-i2\pi ft} dt, \quad (5)$$

where caf is complex ambiguity function 330, τ is a differential time offset, f is a differential frequency offset, $s_1(t)$ is the set of samples 312 of first electrical signal 220 generated by first receiver 213, $s_2^*(t)$ is the complex conjugate of $s_2(t)$ in which $s_2(t)$ is the set of samples 318 of second electrical signal 221 generated by second receiver 217, i is the imaginary number that is the square root of negative one, t is time, and T is the period of time over which samples 312 were generated.

In this illustrative example, samples 312, $s_1(t)$, generated by first receiver 213 and samples 318, $s_2(t)$, generated by second receiver 217 may be offset in time and/or frequency. Complex ambiguity function 330 may be used to correlate these two sets of samples to identify values for these offsets.

In particular, signal processing system 306 identifies differential frequency offset 332, f, and differential time offset 334, τ, that maximize complex ambiguity function 330. Differential frequency offset 332 and differential time offset 334 are examples of number of parameters 328. When complex ambiguity function 330 is maximized, samples 312 are most highly correlated with samples 318.

Signal processing system 302 may identify number of parameters 327 using samples 312 and samples 318 in a manner similar to the manner in which signal processing system 306 identifies number of parameters 328. In this manner, the exchange of information between first receiver 213 and second receiver 217 allows first receiver 213 and second receiver 217 to cooperatively detect signal 207.

Further, using samples 312 and samples 318 for only the "on" portions of signal 207 reduces the amount of processing and/or number of computations required for computing complex ambiguity function 330. A signal with a duty factor of 1 may require (NF)log(NF) processing operations of complex ambiguity function 330, where N is the number of time samples and F is the number of frequency samples. A signal with a duty factor of D may require (NF/D)log(NF/D) processing operations of complex ambiguity function 330. When the duty factor, D, is low for signal 207, savings in time and the number of processing operations that need to be performed may be large as compared to signal 207 with a higher duty factor.

In some illustrative examples, first desired information 325 may be included in first information 310 sent to second receiver 217. Further, second desired information 326 may be included in second information 316 sent to first receiver 213. For example, signal processing system 302 may be able to detect signal 207 without needing second information 316 generated by second receiver 217. For example, signal 207 may be transmitted within detection range 222 in FIG. 2 of first receiver 213. As a result, signal processing system 302 may be able to identify first desired information 325 using only samples 312.

When second receiver 217 receives first desired information 325 in first information 310, second receiver 217 uses first desired information 325 to improve detection of signal 207 by second receiver 217. Similarly, when first receiver 213 receives second desired information 326 in second information 316, first receiver 213 uses second desired information 326 to improve detection of signal 207 by first receiver 213.

In these illustrative examples, each of first receiver 213 and second receiver 217 may detect one or more sequences of pulses in first electrical signal 220 and second electrical signal 221, respectively. For example, first receiver 213 may detect two different sequences of pulses. Second receiver 217 may detect one sequence of pulses. First receiver 213 and second receiver 217 may work cooperatively to classify these sequences of pulses such that the sequences may be matched.

For example, first receiver 213 and second receiver 217 may work together to determine whether one of the two sequences of pulses detected by first receiver 213 matches the sequence of pulses detected by second receiver 217. If a match is found, first receiver 213 and second receiver 217 may classify these two sequences of pulses as being transmitted from the same source.

When classifying signals, first receiver 213 and second receiver 217 each perform operations to pre-classify a signal independently prior to the two receivers working cooperatively. In these illustrative examples, first receiver 213 and second receiver 217 may use number of histograms 335 for use in classifying signal 207. A histogram estimates the probability distribution for a variable, such as a parameter for signal 207.

In a histogram, a data point is added to a discrete bin when the data point falls within the bin. Number of histograms 335 may include, for example, without limitation, at least one of a regular histogram, a stochastic histogram, a circular stochastic histogram, a stochastic consecutive histogram, a consecutive stochastic diffogram, and other suitable types of histograms.

In this manner, first receiver 213 in first receiver system 210 and second receiver 217 in second receiver system 212 work cooperatively to detect and classify signals, such as signal 207. As a result, first transducer system 211 in first receiver system 210 and second transducer system 216 in second receiver system 212 may be reduced in size and/or other physical parameters to reduce a cost and/or weight of first receiver system 210 and second receiver system 212, respectively.

The illustrations of signal processing environment 200 in FIG. 2 and cooperative detection and classification system 300 in FIG. 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, network 202 may include additional receiver systems in addition to first receiver system 210 and second receiver system 212. For example, a third receiver system may be present in network 202. Second receiver system 212 may use first information 310 received from first receiver system 210, as well as information received from the third receiver system to detect signals.

Figure 4:
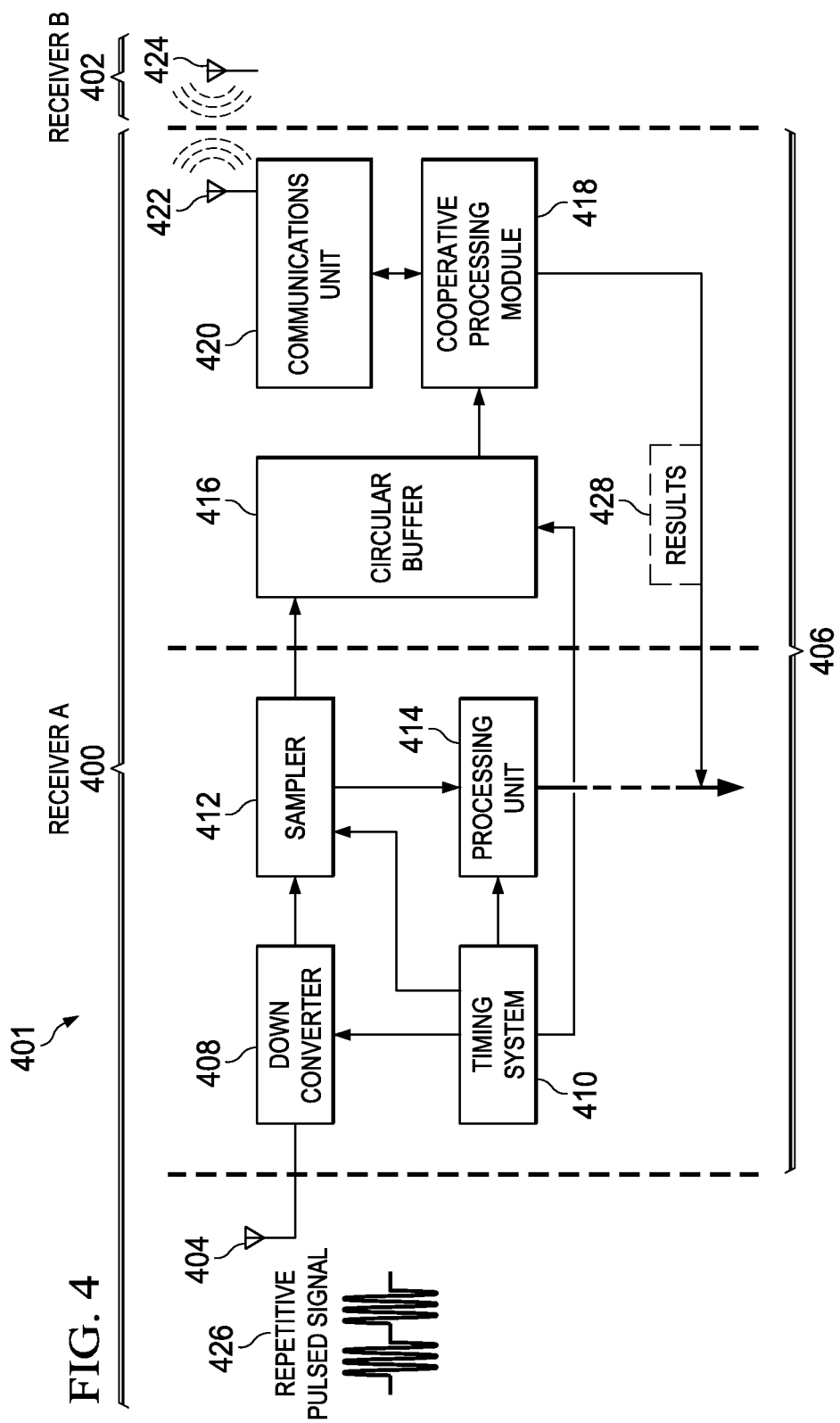
FIG. 4 is an illustration of a cooperative detection and classification system in accordance with an illustrative embodiment.

With reference now to FIG. 4, an illustration of a cooperative detection and classification system is depicted in accordance with an illustrative embodiment. In this illustrative example, receiver system 400 and receiver system 402 form cooperative detection and classification system 401. Receiver system 400 is an example of one implementation for first receiver system 210 in FIG. 2. Receiver system 402 is an example of one implementation for second receiver system 212 in FIG. 2. In this example, only a portion of receiver system 402 is depicted.

In this illustrative example, receiver system 400 includes antenna 404 and receiver 406. Antenna 404 is an example of one implementation for first transducer system 211 in FIG. 2. Receiver 406 is an example of one implementation for first receiver 213 in FIGS. 2 and 3.

Receiver 406 includes down converter 408, timing system 410, sampler 412, processing unit 414, circular buffer 416, cooperative processing module 418, communications unit 420, and antenna 422. Down converter 408, timing system 410, sampler 412, processing unit 414, circular buffer 416, and cooperative processing module 418 together form a signal processing system in receiver 406. This signal processing system is an example of one implementation for signal processing system 302 in FIG. 3.

In this illustrative example, down converter 408, timing system 410, sampler 412, and processing unit 414 may be components in currently available receiver systems. Circular buffer 416, cooperative processing module 418, communications unit 420, and antenna 422 are examples of components that may be added to currently available receiver systems to allow these currently available receiver systems to participate in the cooperative detection and cooperative classification of signals.

Communications unit 420 and antenna 422 form a communications system for receiver 406. This communications system is an example of one implementation for communications system 304 in FIG. 3. Antenna 422 is configured to send and receive information using wireless communications links. As one illustrative example, antenna 422 is configured to receive information sent by antenna 424 in receiver system 402.

In this illustrative example, antenna 404 in receiver system 400 is configured to receive electromagnetic waves. In one illustrative example, antenna 404 receives electromagnetic waves carrying repetitive pulsed signal 426. In particular, repetitive pulsed signal 426 comprises a train group. Antenna 404 converts these electromagnetic waves into an electrical signal and sends this electrical signal to down converter 408 for processing.

Down converter 408 is configured to down convert the electrical signal being received from antenna 404 using the timing information provided by timing system 410. Timing system 410 also provides timing information to sampler 412 and processing unit 414. Down converter 408 sends the down converted electrical signal to sampler 412.

Sampler 412 samples the down converted electrical signal and stores these samples in circular buffer 416. Further, sampler 412 sends these samples to processing unit 414 for processing. Processing unit 414 may use these samples to try to detect repetitive pulsed signal 426 independently from any information provided by receiver system 402.

The samples stored in circular buffer 416 may be retrieved by cooperative processing module 418. Cooperative processing module 418 may correlate the samples stored in circular buffer 416 with samples received from receiver system 402 through antenna 422 and communications unit 420 to cooperatively detect repetitive pulsed signal 426. In particular, cooperative processing module 418 may use a complex ambiguity function, such as complex ambiguity function 330 in FIG. 3, to perform this correlation.

When cooperative processing module 418 detects repetitive pulsed signal 426, cooperative processing module 418 identifies a number of parameters for repetitive pulsed signal 426. These parameters may include, for example, frequency, pulse width, modulation parameters, and/or other parameters for the signal.

In this illustrative example, when receiver system 402 detects a signal, receiver system 402 may send desired information about the signal generated by receiver system 402 to receiver system 400. This signal may or may not be repetitive pulsed signal 426.

Cooperative processing module 418 uses the information received from receiver system 402 and the information about repetitive pulsed signal 426 generated by cooperative processing module 418 to classify repetitive pulsed signal 426. Further, cooperative processing module 418 determines whether repetitive pulsed signal 426 and the signal detected by receiver system 402 are the same signal and/or were transmitted by the same transmitter system.

In this illustrative example, results 428 of the cooperative detection and cooperative classification performed by cooperative processing module 418 are sent to processing unit 414 for further processing. Processing unit 414 may record results 428 for use in processing future samples received from sampler 412.

The illustration of receiver system 400 and receiver system 402 in FIG. 4 is not meant to imply physical or architectural limitations to the manner in which an illustrative embodiment may be implemented. Other components in addition to and/or in place of the ones illustrated may be used. Some components may be excluded or combined with other components. Further, the different components shown in FIG. 4 may be combined with one or more components in FIG. 3, used with components in FIG. 3, or a combination of the two. Additionally, some of the components in this figure are illustrative examples of how components shown in block form in FIG. 4 can be implemented as physical structures.

Figure 5:
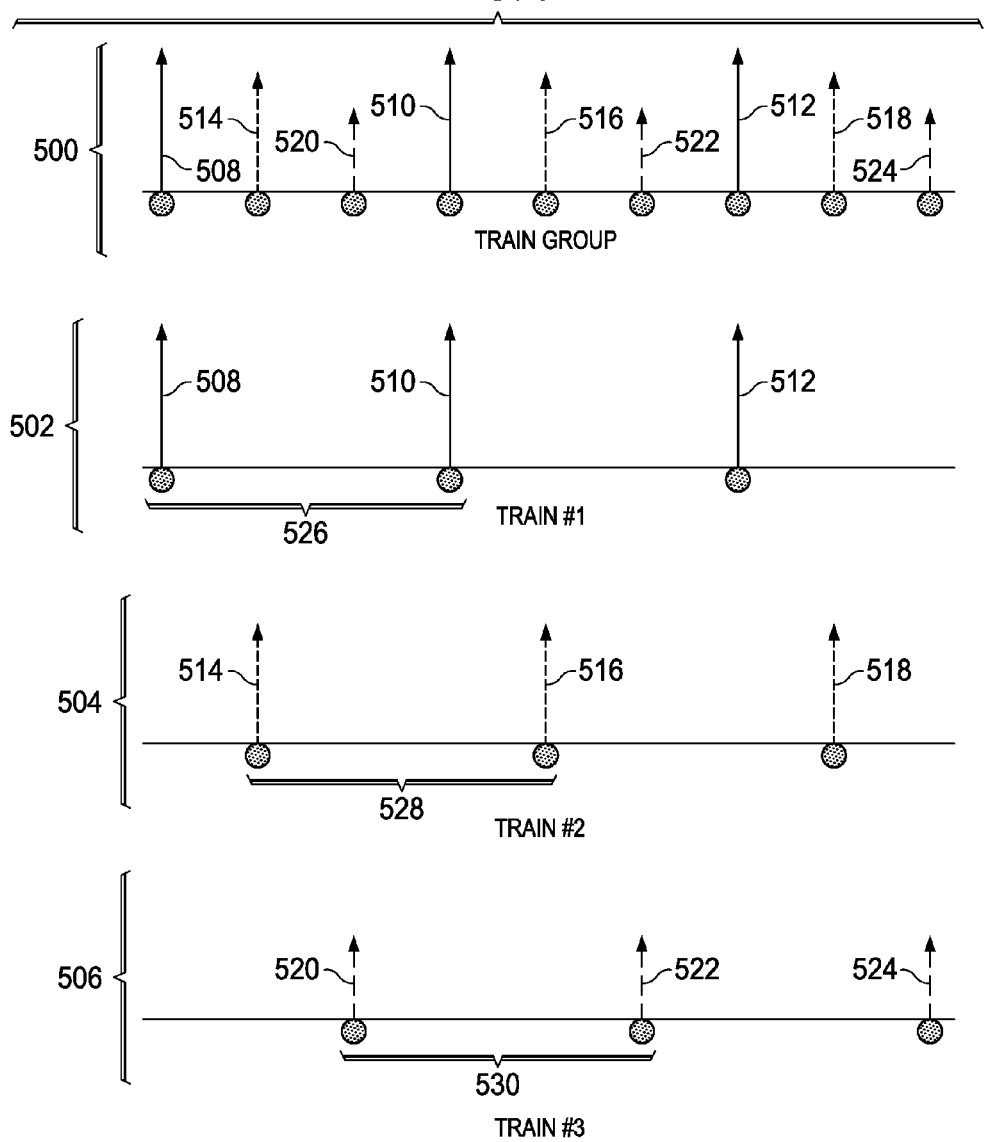
FIG. 5 is an illustration of a train group in accordance with an illustrative embodiment.

With reference now to FIG. 5, an illustration of a train group is depicted in accordance with an illustrative embodiment. Train group 500 is an example of a repeating sequence of pulses, such as sequence of pulses 324 in FIG. 3, that may be detected by a receiver system.

In this illustrative example, train group 500 includes pulse train 502, pulse train 504, and pulse train 506. Pulses 508, 510, and 512 in train group 500 belong to pulse train 502. Pulses 514, 516, and 518 in train group 500 belong to pulse train 504. Further, pulses 520, 522, and 524 in train group 500 belong to pulse train 506.

As depicted, all of the pulse trains in train group 500 have a common pulse repetition interval. In other words, substantially the same amount of time is present between pulses in pulse train 502, pulse train 504, and pulse train 506.

In particular, pulse train 502 has pulse repetition interval 526. Pulse train 504 has pulse repetition interval 528. Pulse train 506 has pulse repetition interval 530. Pulse repetition intervals 526, 528, and 530 are substantially the same in this illustrative example. The intervals of time between pulse 508 and pulse 514, between pulse 514 and pulse 520, and between pulse 520 and pulse 510 may be substantially the same or different.

Figure 6:
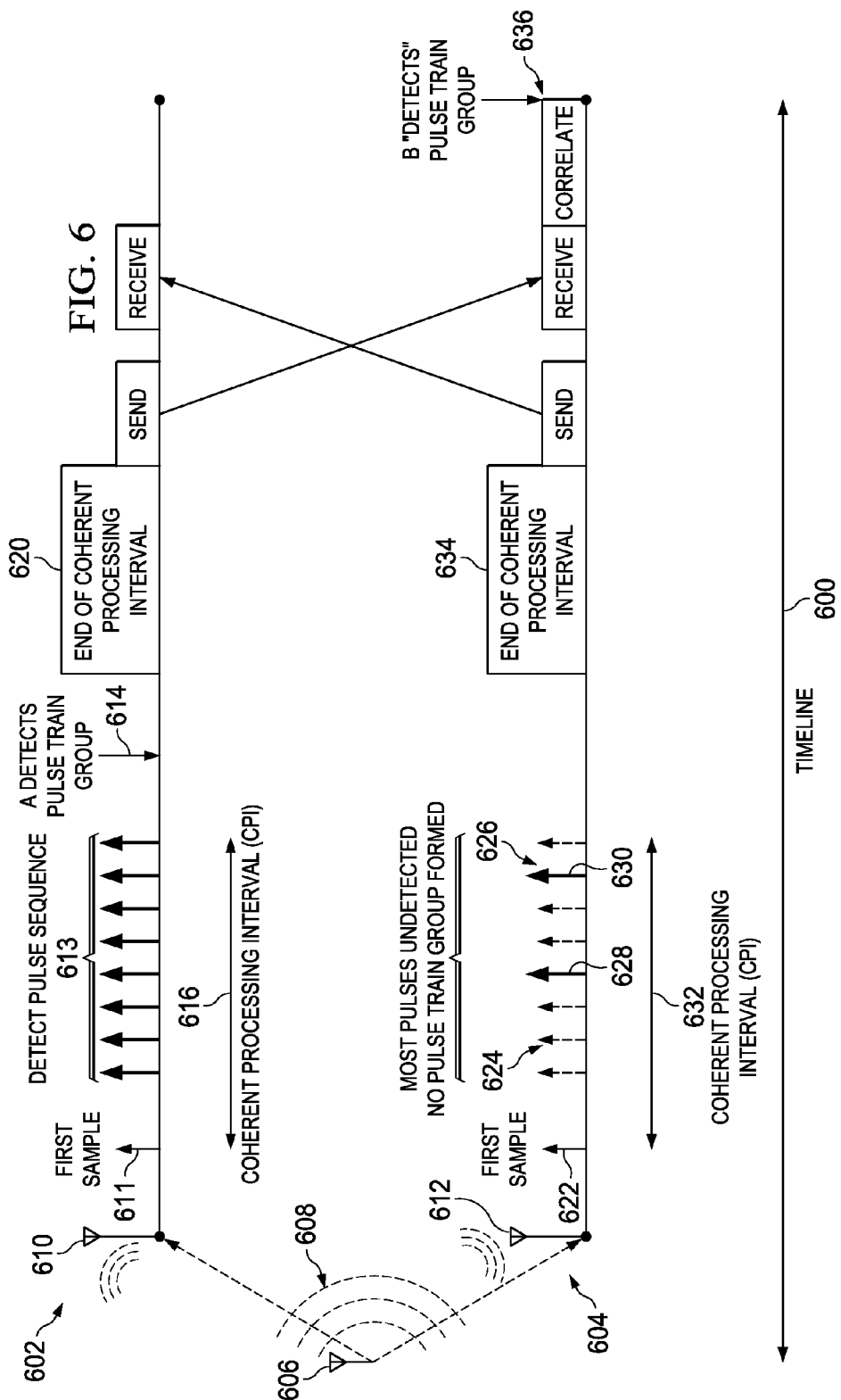
FIG. 6 is an illustration of a timeline for processing signals received by a receiver system in accordance with an illustrative embodiment.

With reference now to FIG. 6, an illustration of a timeline for processing signals received by a receiver system is depicted in accordance with an illustrative embodiment. In this illustrative example, timeline 600 is a timeline for receiver system 602 and receiver system 604 performing cooperative detection and classification. Receiver system 602 may be implemented using, for example, first receiver system 210 in FIG. 2 and/or receiver system 400 in FIG. 4. Further, receiver system 604 may be implemented using second receiver system 212 in FIG. 2 and/or receiver system 402 in FIG. 4.

As depicted in this example, antenna 606 is transmitting a signal in the form of electromagnetic waves 608. Antenna 610 in receiver system 602 is configured to receive electromagnetic waves 608 and convert any electromagnetic waves received into an electrical signal. Similarly, antenna 612 in receiver system 604 is configured to receive and convert any electromagnetic waves received into an electrical signal.

In this illustrative example, receiver system 602 generates samples using the electrical signal received from antenna 610. Sample 611 is an example of the first of these samples. Receiver system 602 uses the samples to determine whether a signal is detected. In this depicted example, receiver system 602 detects sequence of pulses 613 at time 614. In this illustrative example, sequence of pulses 613 is a sequence of pulses in the signal being carried by electromagnetic waves 608. In particular, sequence of pulses 613 may be a train group.

More specifically, sequence of pulses 613 form coherent processing interval (CPI) 616. Coherent processing interval 616 is the interval within which a train group comprising pulses having a substantially same pulse repetition interval (PRI) are detected. At end 620 of coherent processing interval 616, receiver system 602 sends the samples generated and any information generated about sequence of pulses 613 to receiver system 604.

As depicted, receiver system 604 generates samples of the electrical signal received from antenna 612. Sample 622 is the first of these samples. In this depicted example, pulses 624 are the pulses in the signal being carried in electromagnetic waves 608 that are undetected by receiver system 604. Pulses 626 are the pulses in the signal being carried in electromagnetic waves 608 that are detected by receiver system 604. Pulses 626 include pulse 628 and pulse 630.

In this illustrative example, pulses 624 and pulses 626 together form coherent processing interval (CPI) 632. At end 634 of coherent processing interval 632, receiver system 604 sends the samples generated and any information generated about pulses 626 to receiver system 602.

As depicted, receiver system 604 uses the detection of pulses 626 and the information provided by receiver system 602 to detect the signal carried in electromagnetic waves 608. In particular, receiver system 604 uses detection of pulses 626 and the information provided by receiver system 602 to detect sequence of pulses 613. For example, after correlating the samples received from receiver system 602 with the samples generated by receiver system 604, receiver system 604 detects sequence of pulses 613 at time 636.

Figure 7:
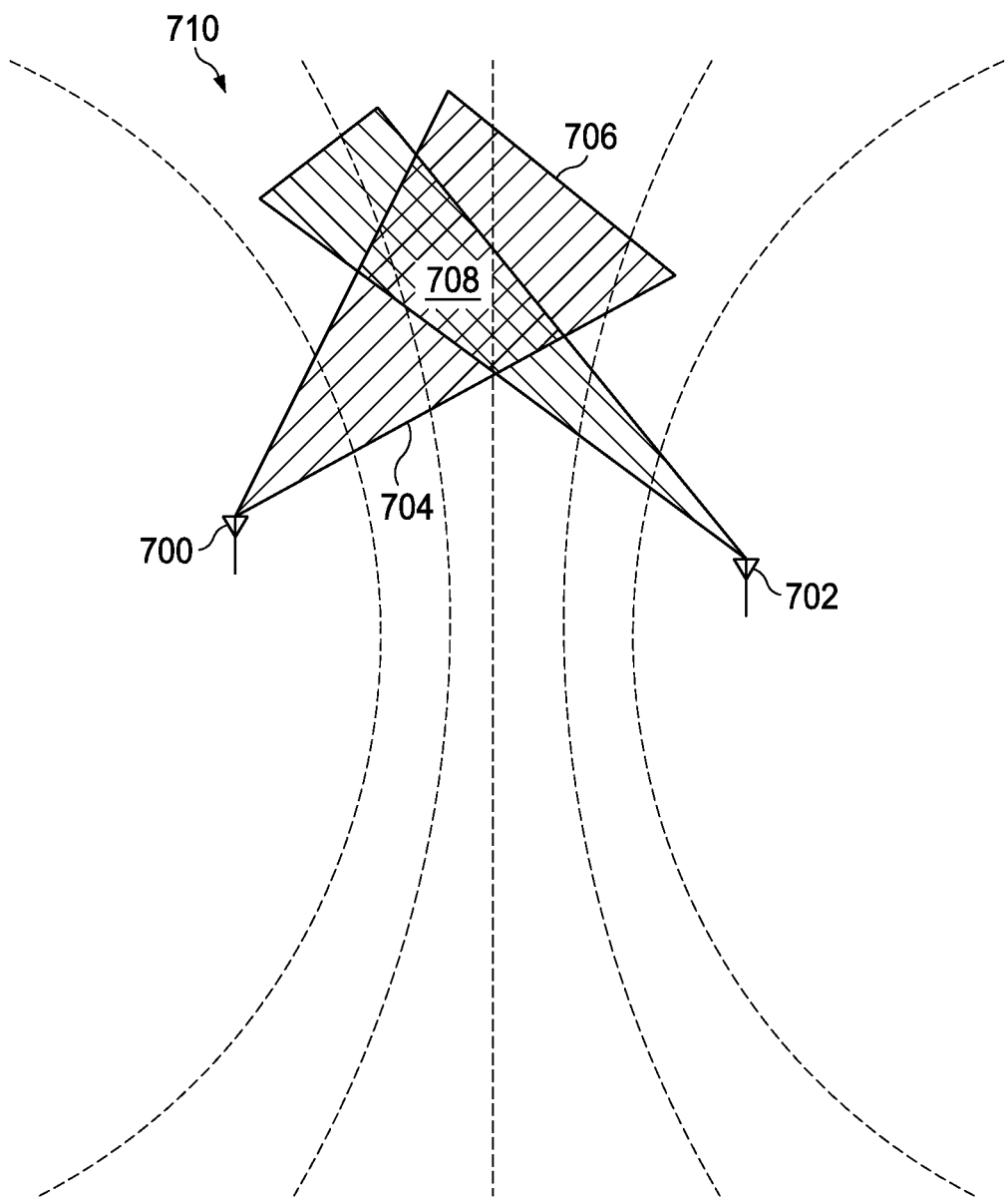
FIG. 7 is an illustration of angles of arrival and isochrones in accordance with an illustrative embodiment.

With reference now to FIG. 7, an illustration of angles of arrival and isochrones is depicted in accordance with an illustrative embodiment. In this illustrative example, antenna 700 and antenna 702 are configured to receive electromagnetic waves.

Angle of arrival 704 may be the angle of arrival identified for a signal detected in the electromagnetic waves received at antenna 700. Angle of arrival 706 may be the angle of arrival identified for the same signal detected in the electromagnetic waves received at antenna 702. Angle of arrival 704 and angle of arrival 706 are examples of parameters in number of parameters 327 and number of parameters 328 in FIG. 3.

As depicted, angular area 708 is the intersection of angle of arrival 704 and angle of arrival 706. In this manner, the source of the signal detected in the electromagnetic waves received at both antenna 700 and antenna 702 is located within angular area 708.

Further, isochrones 710 with respect to antenna 700 and antenna 702 are also depicted. Each of isochrones 710 identifies locations for the source of the signal that has the same time difference of arrival between the transmission of the signal to the reception of the signal by antenna 700 and antenna 702, respectively. In other words, for example, the signal may take the same amount of time from transmission to reception when transmitted from any of the locations that lie along isochrones 710.

Figure 8:
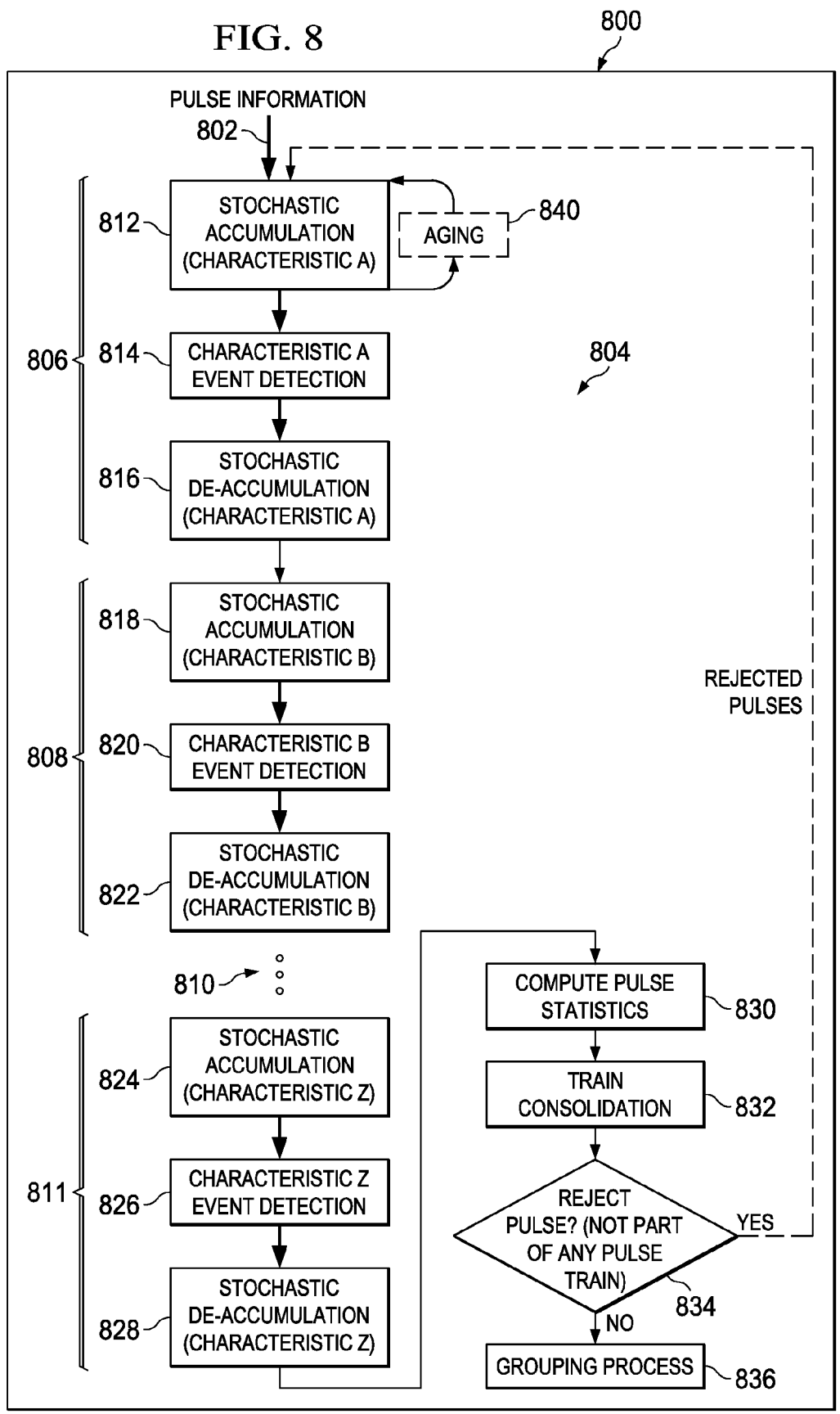
FIG. 8 is an illustration of a data flow for a detection and classification process in accordance with an illustrative embodiment.

With reference now to FIG. 8, an illustration of a data flow for a detection and classification process is depicted in accordance with an illustrative embodiment. In this illustrative example, detection and classification process 800 may be performed using a receiver, such as, for example, a receiver for a receiver system in receiver systems 204 in FIG. 2. For example, detection and classification process 800 may be performed by first receiver 213 in FIGS. 2-3, second receiver 217 in FIGS. 2-3, receiver 406 in FIG. 4, or some other suitable type of receiver.

Detection and classification process 800 receives pulse information 802 as input. Pulse information 802 may be received continuously over time or periodically, depending on the implementation.

Pulse information 802 may include data identified for a plurality of parameters for each pulse identified by the receiver. As one illustrative example, pulse information 802 may include a frequency, a pulse width, a phase, an angle of arrival, a time of arrival, at least one modulation parameter, a type of modulation, and/or other suitable information for each pulse identified by the receiver. Further, pulse information 802 may also include one or more parameters for pairs or groups of pulses identified by the receiver. For example, pulse information 802 may include a pulse repetition interval identified for each pair of pulses.

Detection and classification process 800 processes pulse information 802 using plurality of histogram processes 804. The receiver uses plurality of histogram processes 804 to generate a plurality of histograms for the plurality of parameters in pulse information 802. In particular, plurality of histogram processes 804 generates stochastic histograms. In these illustrative examples, a stochastic histogram is generated for each parameter identified in pulse information 802. The stochastic histogram generated may be selected from one of a regular stochastic histogram, a consecutive stochastic diffogram, or a circular stochastic histogram.

A regular stochastic histogram uses the measured or assumed variance for a parameter to spread the histogram when each data point or value is added to the histogram. In other words, a stochastic histogram takes into account the uncertainty and/or variance of the data identified for the parameter.

For example, in these illustrative examples, with a stochastic histogram, a data point may be added to the bin in which the data point falls and also added to the two bins on each side of the bin. In this manner, the data points are weighted individually such that the stochastic histogram approaches a more accurate probability density function (pdf) for the variable as compared to a regular histogram. By weighting each data point individually, the presence of noise in the data may be reduced.

With a stochastic histogram, the bin size may be set by the standard deviation of the data, and the probability density function may be assumed to be Gaussian. Of course, other types of probability density functions may be estimated using this type of stochastic histogram. In these illustrative examples, if x is the data or value identified for the parameter with variance $\sigma^2$ and a bin consists of the following interval:

$$[b-\Delta b/2, b+\Delta b/2], \quad (6)$$

where b is the bin, then the value of that bin for a Gaussian histogram becomes:

$$\frac{1}{\sigma\sqrt{2\pi}} \int_{b-\Delta b/2}^{b+\Delta b/2} \exp(-((t-x+b)/\sigma)^2) \quad (7)$$

where t is time.

A consecutive stochastic diffogram may have bins for data points identified for pairs or groups of consecutive pulses. For example, a consecutive stochastic diffogram may select pulse trains that have a substantially constant pulse repetition interval.

A pulse repetition interval is the time between pulses in the pulse train. Let $\{x_i\}_{i=1,\ldots,n}$ be the times of arrival (TOA) of pulses. The set of differences $\{x_i - x_j\}_{i>j}$ is then computed. This set may be constrained by the minimum and maximum limits for the potential pulse repetition intervals. The buildup of n total pulse slots with m missing pulses in the bin B with PRI∈B is at most n−m−1 and at least n−2m−1.

Each data point, $\delta = x_i - x_j$, is added to a bin B in a consecutive stochastic diffogram with each bin B containing:

$$\{y, [b-\Delta b, b+\Delta b], x_{old}\} \quad (8)$$

where y is the value for the bin, $[b-\Delta b, b+\Delta b]$ is the interval for the bin, and $x_{old}$ is the previous value for the bin. Then, if $\delta \in B$ and $x_j \ne x_{old}$, y is incremented and $x_{old}$ is replaced by $x_j$. Each data point is a vector, and each bin is incremented based on matching the vector against another vector stored in the bin. In other words, the consecutive stochastic diffogram is a vector valued histogram.

A circular stochastic histogram may be a stochastic histogram used for circular parameters. Circular parameters may include, for example, without limitation, an angle of arrival, a phase difference of arrival, longitude, and/or other suitable types of parameters.

As depicted, plurality of histogram processes 804 may include first histogram process 806, second histogram process 808, number of other histogram processes 810, last histogram process 811, and other histogram processes (not shown). First histogram process 806 may be configured to generate a stochastic histogram for a first parameter, such as frequency. Second histogram process 808 may be configured to generate a stochastic histogram for a second parameter, such as pulse width. Last histogram process 811 may be configured to generate a consecutive stochastic diffogram for a third parameter, such as a pulse repetition interval.

In this illustrative example, first histogram process 806 receives pulse information 802 as input. First histogram process 806 includes accumulation process 812, event detection process 814, and de-accumulation process 816. A stochastic histogram is created and accumulated for the first parameter in pulse information 802 in accumulation process 812. Data points are added to the bins for the stochastic histogram based on the value for the first parameter for each pulse identified in pulse information 802.

Accumulation process 812 also creates a linked list for each bin in the stochastic histogram based on the data points added to the bins. The linked list may be a list of linked nodes in which each node includes information about the pulse corresponding to the data point or value added to the bin. For example, each node may include a pulse identifier for the pulse, a time of arrival for the pulse, the value added to the bin for the pulse, and/or other suitable information.

Event detection process 814 monitors the accumulation of the stochastic histogram by accumulation process 812 to detect an event for the first parameter. An event may be, for example, the value for a particular bin in the stochastic histogram being greater than some selected value. In response to the detection of an event, de-accumulation process 816 extracts the data for the pulses corresponding to the detected event from the stochastic histogram to de-accumulate the stochastic histogram. The information in pulse information 802 corresponding to the pulses for which data is extracted from the stochastic histogram are then used by second histogram process 808.

Second histogram process 808 includes accumulation process 818, event detection process 820, and de-accumulation process 822. These processes are performed using the information in pulse information 802 corresponding to the pulses for which data is extracted from the stochastic histogram in a manner similar to the processes in first histogram process 806 to generate a stochastic histogram for the second parameter.

Similarly, last histogram process 811 includes accumulation process 824, event detection process 826, and de-accumulation process 828. These processes in last histogram process 811, as well as the processes in each of number of other histogram processes 810, are performed in a manner similar to the processes in first histogram process 806 and second histogram process 808.

In these illustrative examples, plurality of histogram processes 804 may run continuously when pulse information 802 is received continuously. For example, de-accumulation of the stochastic histogram generated by first histogram process 806 may not terminate first histogram process 806. First histogram process 806 may continue accumulating the stochastic histogram using pulse information 802 even when second histogram process 808 and other histogram processes begin. Further, event detection processes 814, 820, and 826 may continuously monitor the accumulation of the corresponding stochastic histograms to monitor for multiple events.

The output of de-accumulation process 828 in last histogram process 811 is sent as an input to statistics process 830. The output of de-accumulation process 828 contains the information in pulse information 802 for the pulses belonging to all of the events detected by plurality of histogram processes 804. In particular, the output of de-accumulation process 828 identifies a sequence of pulses for processing by statistics process 830.

Statistics process 830 computes statistics for the final pulses identified in the output of de-accumulation process 828 using the corresponding information in pulse information 802. These statistics may include statistics for single pulses, pairs of pulses, and/or or other combinations of pulses. For example, the statistics may include one-dimensional statistics for a single pulse, such as an average pulse width, and/or two-dimensional statistics for a pair of pulses, such as a pulse repetition interval.

In one illustrative example, the one-dimensional statistics for a pulse may be computed as follows:

$$\sum_i w_i, \sum_i w_i x_i, \sum_i w_i x_i^2 \qquad (9)$$

where $x_i$ is a value added to a bin in a stochastic histogram, and $w_i = 1/\sigma_i^2$ is the weight associated with the value. The two-dimensional characteristics for a pair of pulses may be computed as follows:

$$\sum_i w_i, \sum_i w_i x_i, \sum_i w_i x_i^2 \qquad (10)$$

$$\sum_i v_i, \sum_i v_i y_i, \sum_i v_i y_i^2, \sum_i w_i v_i x_i y_i \qquad (11)$$

where $\{x_i, y_i\}$ is the pair of values added to the bin for the pair of pulses and $\{w_i, v_i\}$ is the pair of weights associated with the pair of values.

The output of statistics process 830 is sent to train consolidation process 832. Train consolidation process 832 identifies which of these final pulses may belong to a same pulse train based on the statistics computed for the pulses. In particular, train consolidation process 832 outputs a list of pulses ordered with respect to time having similar characteristics.

Decision process 834 uses the output of train consolidation process 832 to determine whether any of the final pulses do not belong to the pulse train identified by train consolidation process 832. If any of the final pulses do not belong to the pulse train, decision process 834 sends the information for these pulses back into first histogram process 806.

Further, decision process 834 sends the output from train consolidation process 832 as input into grouping process 836. Grouping process 836 groups pulse trains received over time based on similar characteristics for these pulse trains. In particular, grouping process 836 groups pulse trains that may originate from the same source together.

Additionally, in this illustrative example, aging process 840 may be performed within detection and classification process 800. With each stochastic histogram generated, linked lists of data points belonging to each bin are tracked with respect to time. Aging process 840 may remove data points from a bin gradually over time using a series of time weights based on a set of time interval ages. In this manner, the weighting may cause exponential, uniform, or some other type of time-based de-accumulation of the histogram.

In one illustrative example, the weighting of data points added to the bin within about three minutes of a current point in time may be decreased by a first amount. The weighting of data points added to the bin within about six minutes of a current point in time may be decreased by two times the first amount.

The different processes in detection and classification process 800 in FIG. 8 are described in greater detail in FIGS. 9-14 below. The processes described in FIGS. 9-14 may be used to implement the different processes in detection and classification process 800 alone or in conjunction with other processes, depending on the implementation.

Figure 9:
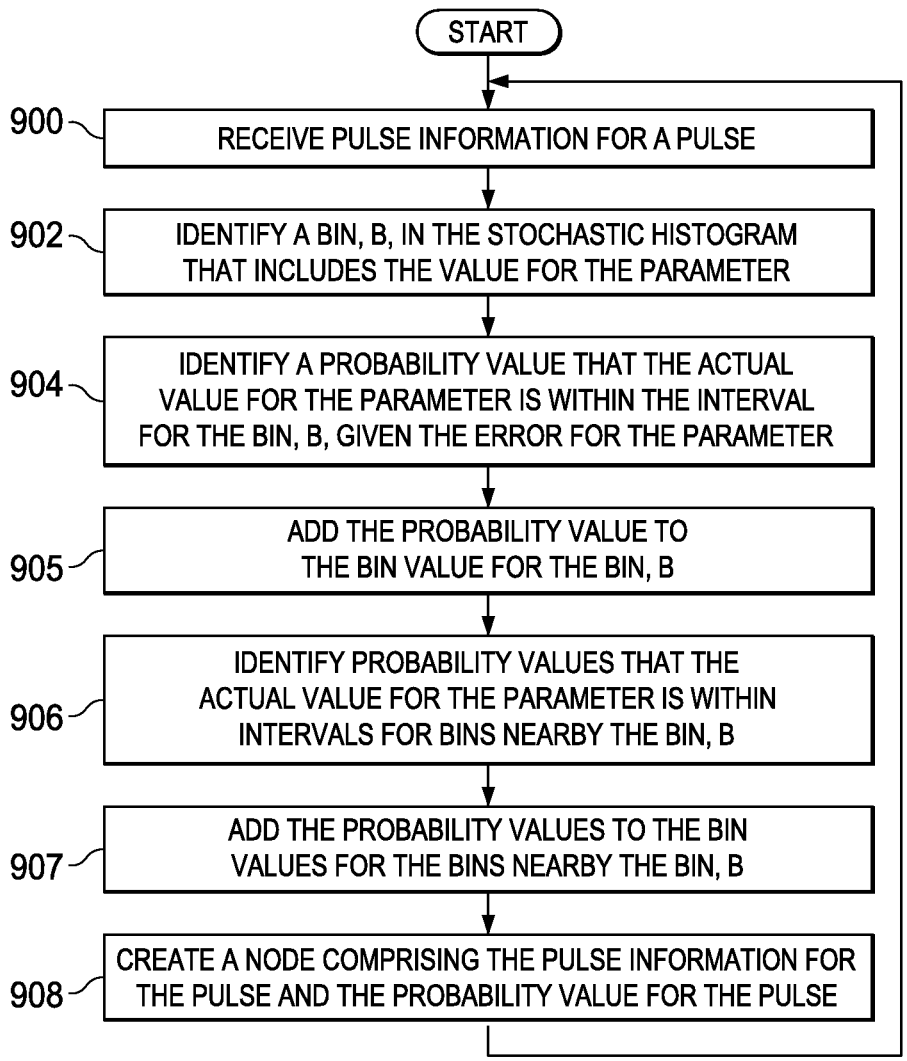
FIG. 9 is an illustration of a process for accumulating a regular stochastic histogram in the form of a flowchart in accordance with an illustrative embodiment.

With reference now to FIG. 9, an illustration of a process for accumulating a regular stochastic histogram in the form of a flowchart is depicted in accordance with an illustrative embodiment. The process illustrated in FIG. 9 may be implemented by a receiver in a receiver system, such as, for example, first receiver 213 in FIGS. 2-3, second receiver 217 in FIGS. 2-3, receiver 406 in FIG. 4, or some other suitable type of receiver.

Further, this process may be used to accumulate a regular stochastic histogram for a particular parameter. For example, this process may be used to implement accumulation process 812 in first histogram process 806 or accumulation process 818 in second histogram process 808.

The process begins by receiving pulse information for a pulse (operation 900). The pulse information may include, for example, a pulse identifier for the pulse, a value for the particular parameter for the pulse, and an error. This error is a standard deviation, $\sigma$, for the value for the parameter in this illustrative example.

Next, the process identifies a bin, B, in the stochastic histogram that includes the value for the parameter (operation 902). The process then identifies a probability value that the actual value for the parameter is within the interval for the bin, B, given the error for the parameter (operation 904). The process adds the probability value to the bin value for the bin, B (operation 905).

Further, the process also identifies probability values that the actual value for the parameter is within intervals for bins nearby the bin, B (operation 906). As one illustrative example, in operation 906, the process may identify a probably value that the actual value for the parameter is within an interval for one bin just before the bin, B, and a probably value that the actual value for the parameter is within an interval for another bin just after bin, B. Of course, in other illustrative examples, probability values may be identified for two bins before bin, B, and two bins after bin, B.

Thereafter, the process adds these probability values to the bin values for the bins nearby the bin, B (operation 907). The number of bins nearby the bin, B, to which probability values are identified, may be constrained by a maximum range of bins nearby the bin, B and/or a minimum probability value.

Thereafter, the process creates a node comprising the pulse information for the pulse and the probability value for the pulse (operation 908). The node may be part of a linked list to be used by an aging process, such as, for example, aging process 840 in FIG. 8. The process then returns to operation 900 as described above.

Figure 10:
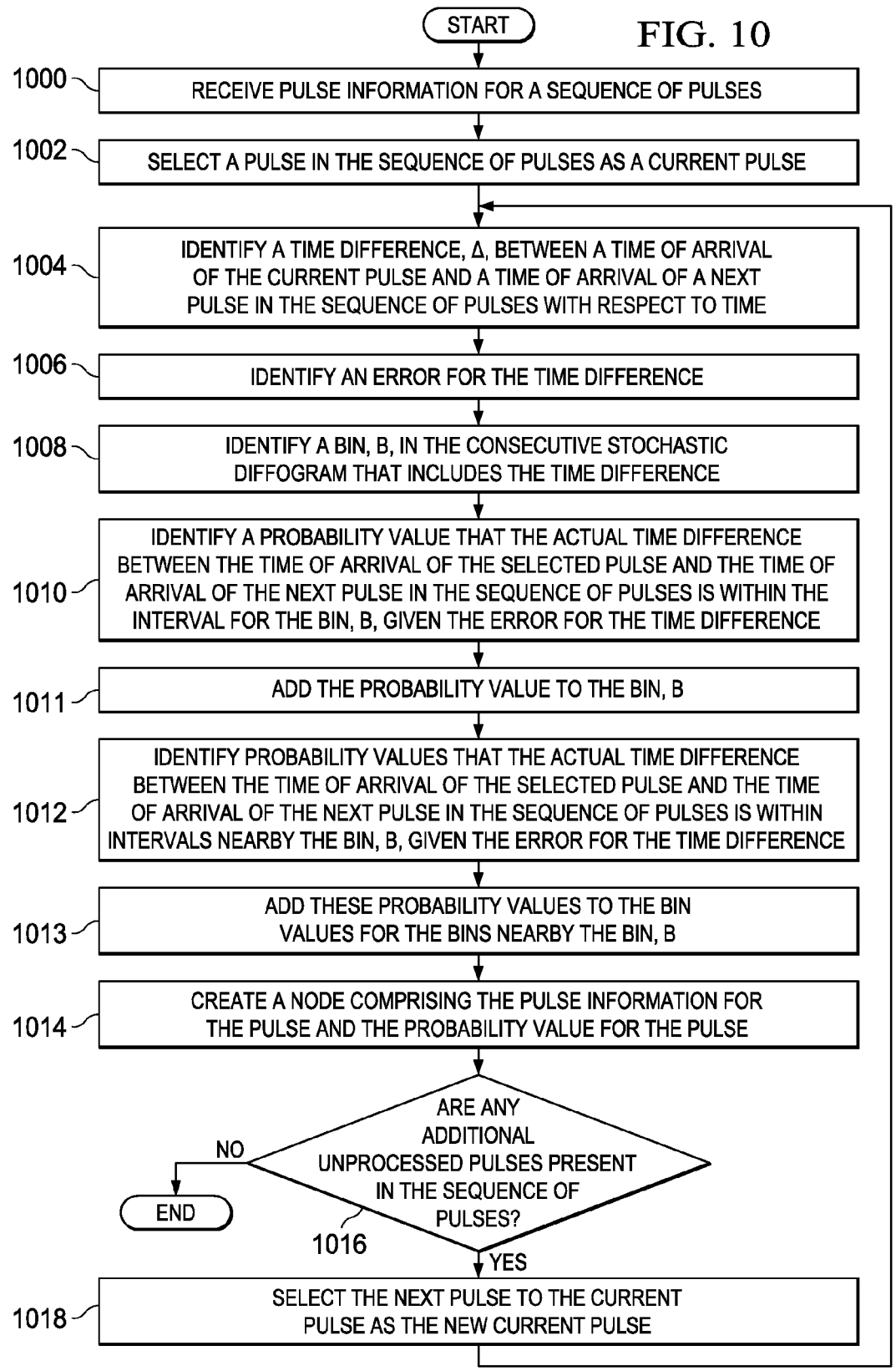
FIG. 10 is an illustration of a process for accumulating a consecutive stochastic diffogram in the form of a flowchart in accordance with an illustrative embodiment.

With reference now to FIG. 10, an illustration of a process for accumulating a consecutive stochastic diffogram is depicted in accordance with an illustrative embodiment. The process illustrated in FIG. 10 may be implemented by a receiver in a receiver system, such as, for example, first receiver 213 in FIGS. 2-3, second receiver 217 in FIGS. 2-3, receiver 406 in FIG. 4, or some other suitable type of receiver.

Further, this process may be used to accumulate a consecutive stochastic diffogram for a particular parameter and/or a particular function of that parameter on a set of selected pulses. The process described in FIG. 10 may be used to accumulate a consecutive stochastic diffogram for computing the time difference between consecutive pulses. In other words, this process may be used for tracking a pulse repetition interval computed for pairs of pulses. For example, this process may be used to implement accumulation process 824 in last histogram process 811.

The process begins by receiving pulse information for a sequence of pulses (operation 1000). The process selects a pulse in the sequence of pulses as a current pulse (operation 1002). In operation 1002, the process identifies the pulse in the sequence of pulses that has the earliest time of arrival as the current pulse.

The process then identifies a time difference, Δ, between a time of arrival of the current pulse and a time of arrival of a next pulse in the sequence of pulses with respect to time (operation 1004). This time difference is an estimate of the pulse repetition interval for the sequence of pulses. Next, the process identifies an error for the time difference (operation 1006). The error may be a standard deviation for the time difference.

The process then identifies a bin, B, in the consecutive stochastic diffogram that includes the time difference (operation 1008). The process identifies a probability value that the actual time difference between the time of arrival of the selected pulse and the time of arrival of the next pulse in the sequence of pulses is within the interval for the bin, B, given the error for the time difference (operation 1010). Thereafter, the process adds the probability value to the bin, B (operation 1011).

The process also identifies probability values that the actual time difference between the time of arrival of the selected pulse and the time of arrival of the next pulse in the sequence of pulses is within intervals nearby the bin, B, given the error for the time difference (operation 1012). The process adds these probability values to the bin values for the bins nearby the bin, B (operation 1013). The number of bins nearby the bin, B, to which probability values are identified may be constrained by a maximum range of bins nearby the bin, B and/or a minimum probability value.

The process then creates a node comprising the pulse information for the pulse and the probability value for the pulse (operation 1014). The node may be part of a linked list to be used in an aging process, such as, for example, aging process 840 in FIG. 8. The process then determines whether any additional unprocessed pulses are present in the sequence of pulses (operation 1016). If additional unprocessed pulses are not present, the process terminates. Otherwise, the process selects the next pulse to the current pulse as the new current pulse (operation 1018). The process then returns to operation 1004 as described above.

Figure 11:
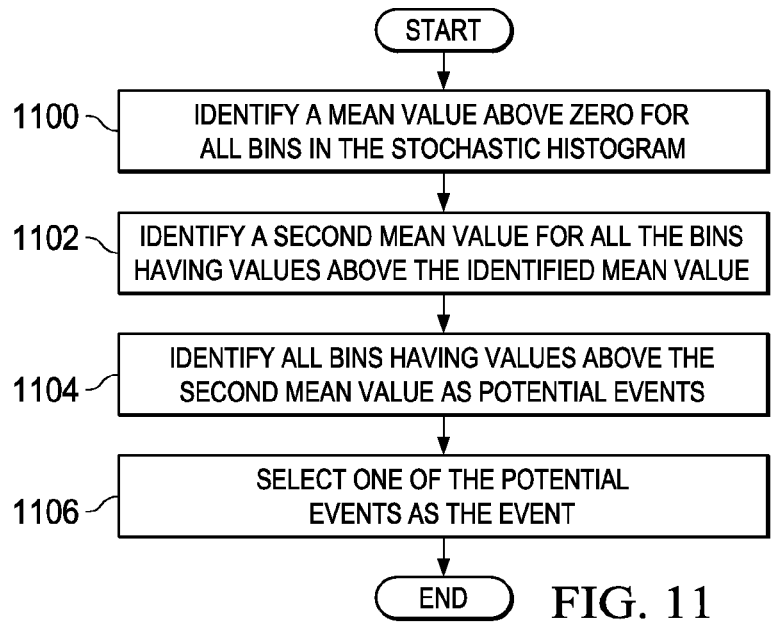
FIG. 11 is an illustration of a process for detecting an event in the form of a flowchart in accordance with an illustrative embodiment.

With reference now to FIG. 11, an illustration of a process for detecting an event in the form of a flowchart is depicted in accordance with an illustrative embodiment. The process illustrated in FIG. 11 may be implemented by a receiver in a receiver system, such as, for example, first receiver 213 in FIGS. 2-3, second receiver 217 in FIGS. 2-3, receiver 406 in FIG. 4, or some other suitable type of receiver.

Further, this process may be used to monitor the accumulation of a stochastic histogram to detect an event. For example, this process may be used to implement event detection process 814, event detection process 820, and event detection process 826 in FIG. 8. The process described in FIG. 11 may be performed each time a value is added to a bin in the stochastic histogram.

The process begins by identifying a mean value above zero for all bins in the stochastic histogram (operation 1100). The process then identifies a second mean value for all the bins having values above the identified mean value (operation 1102). Next, the process identifies all bins having values above the second mean value as potential events (operation 1104).

Thereafter, the process selects one of the potential events as the event (operation 1106), with the process terminating thereafter. When the stochastic histogram is a regular histogram, the process identifies the potential event corresponding to the bin with the largest value as the event in operation 1106.

However, when the stochastic histogram is a consecutive stochastic diffogram, the potential events may represent multiples of the actual pulse repetition interval for the sequence of pulses used to accumulate the consecutive stochastic diffogram. Further, the bins corresponding to the multiples of the actual pulse repetition interval may accumulate more quickly than the bin corresponding to the actual pulse repetition interval. Consequently, the process may identify the first potential event as the event in operation 1106 instead of the potential event corresponding to the bin with the largest value. In this manner, a probability of detecting an event for a multiple of the actual pulse repetition interval may be reduced.

Figure 12:
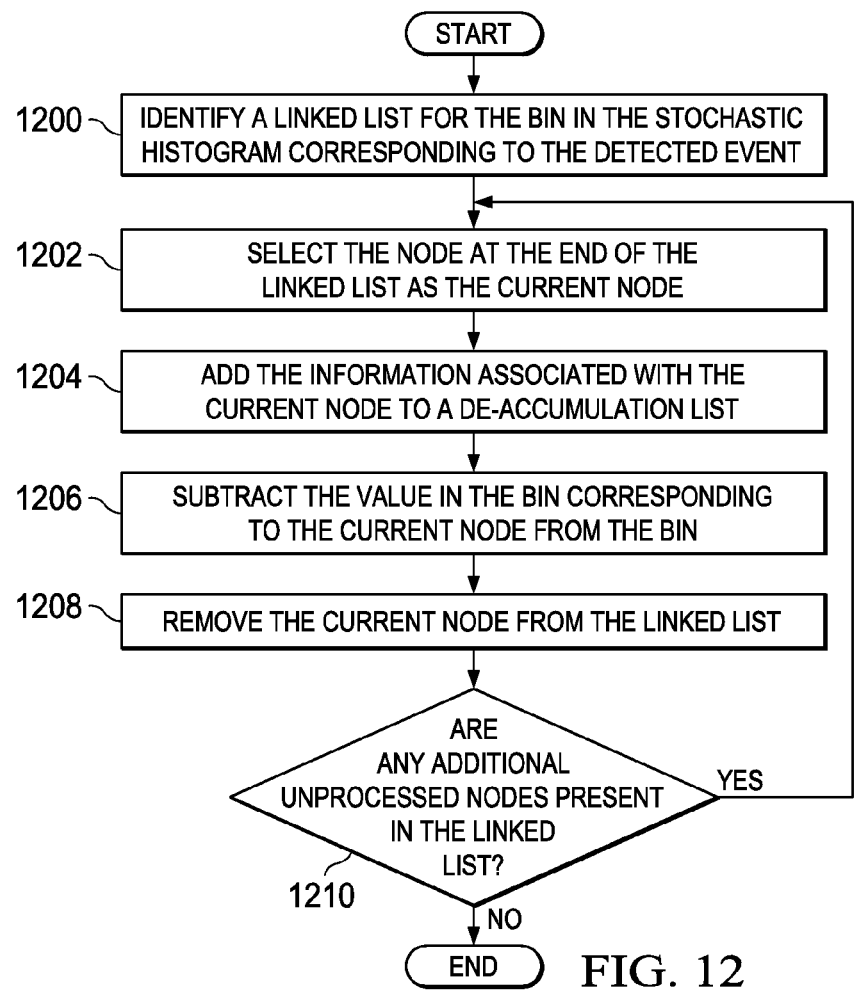
FIG. 12 is an illustration of a process for de-accumulating a stochastic histogram in the form of a flowchart in accordance with an illustrative embodiment.

With reference now to FIG. 12, an illustration of a process for de-accumulating a stochastic histogram in the form of a flowchart is depicted in accordance with an illustrative embodiment. The process illustrated in FIG. 12 may be implemented by a receiver in a receiver system, such as, for example, first receiver 213 in FIGS. 2-3, second receiver 217 in FIGS. 2-3, receiver 406 in FIG. 4, or some other suitable type of receiver.

In particular, this process may be used to de-accumulate a stochastic histogram in response to the detection of an event. For example, this process may be used to implement de-accumulation process 816, de-accumulation process 822, and de-accumulation process 828 in FIG. 8. The process described in FIG. 12 may be performed each time an event is detected. For example, de-accumulation process 816, de-accumulation process 822, and de-accumulation process 828 in FIG. 8 may perform the process described in FIG. 12 each time event detection process 814, event detection process 820, and event detection process 826 in FIG. 8, respectively, detect an event.

The process begins by identifying a linked list for the bin in the stochastic histogram corresponding to the detected event (operation 1200). In one illustrative example, this linked list is a doubly linked list. Each node in the linked list for the bin includes information about a pulse for which a value was added to the bin. In this manner, each node is associated with a pulse and the value for the pulse added to the bin.

The process then selects the node at the end of the linked list as the current node (operation 1202). The process adds the information associated with the current node to a de-accumulation list (operation 1204). The information in the de-accumulation list may be used for accumulating a different stochastic histogram. For example, the de-accumulation list generated by event de-accumulation process 816 in FIG. 8 may be used as input for accumulation process 818 in second histogram process 808 in FIG. 8.

Then, the process subtracts the value in the bin corresponding to the current node from the bin (operation 1206). Thereafter, the process removes the current node from the linked list (operation 1208). The process then determines whether any additional unprocessed nodes are present in the linked list (operation 1210). If additional unprocessed nodes are not present in the linked list, the process terminates. Otherwise, the process returns to operation 1202 as described above. When the process returns to operation 1202, the node at the end of the list that is selected as the new current node is the node that was the previous node to the previous current node.

Figure 13A:
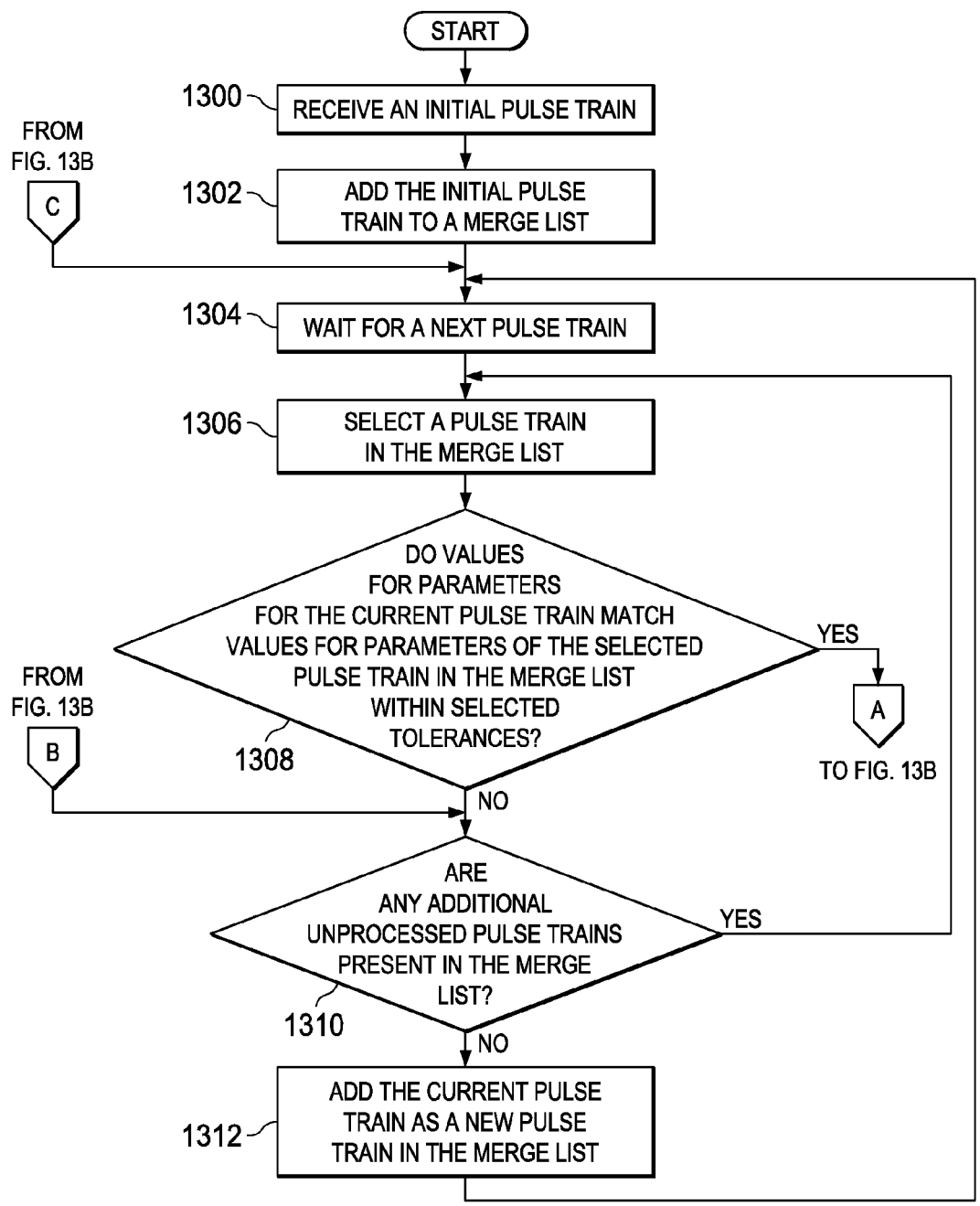
FIGS. 13A and 13B are illustrations of a process for consolidating pulse trains in the form of a flowchart in accordance with an illustrative embodiment.
Figure 13B:
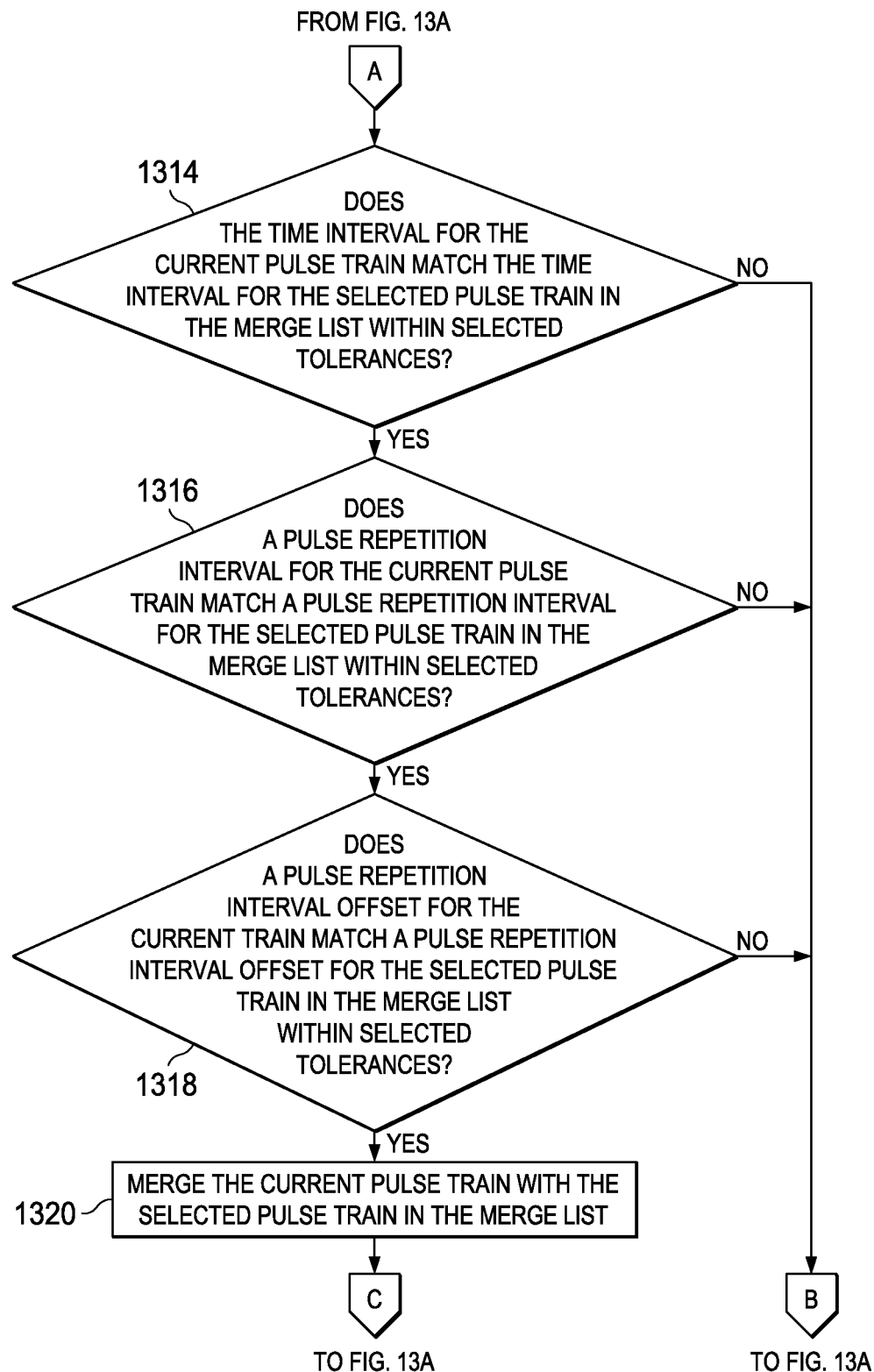

With reference now to FIGS. 13A and 13B, illustrations of a process for consolidating pulse trains in the form of a flowchart are depicted in accordance with an illustrative embodiment. The process illustrated in FIGS. 13A and 13B may be implemented by a receiver in a receiver system, such as, for example, first receiver 213 in FIGS. 2-3, second receiver 217 in FIGS. 2-3, receiver 406 in FIG. 4, or some other suitable type of receiver. In particular, this process may be used to implement train consolidation process 832 in FIG. 8.

The process begins by receiving an initial pulse train (operation 1300). The pulse train received in operation 1300 may be the sequence of pulses output from, for example, de-accumulation process 828 in FIG. 8. The pulse train received in operation 1300 may include pulses within an interval between a first time, t1, and a second time, t2. The process adds the initial pulse train to a merge list (operation 1302).

Then, the process waits for a next pulse train (operation 1304). This next pulse train is now the current pulse train. In response to receiving the next pulse train, the process selects a pulse train in the merge list (operation 1306). The process then determines whether values for parameters for the current pulse train match values for parameters of the selected pulse train in the merge list within selected tolerances (operation 1308).

If the values for parameters for the current pulse train and the values for parameters of the selected pulse train in the merge list do not match within selected tolerances, the process determines whether any additional unprocessed pulse trains are present in the merge list (operation 1310). If additional unprocessed pulse trains are present in the merge list, the process returns to operation 1306 as described above. Otherwise, the process adds the current pulse train as a new pulse train in the merge list (operation 1312). The process then returns to operation 1304 as described above.

With reference again to operation 1308, if the values for parameters for the current pulse train and the values for parameters of the selected pulse train in the merge list match within selected tolerances, the process determines whether the time interval for the current pulse train matches the time interval for the selected pulse train in the merge list within selected tolerances (operation 1314). Operation 1314 may be performed by taking into account an error for the time interval for the current pulse train. For example, [t1−ϵ, t2+ϵ] may be compared to the time interval of the selected pulse train in the merge list, where t1 is the earliest time of the time interval, t2 is the latest time of the time interval, and ϵ is an error for the time interval.

If the time interval for the current pulse train does not match the time interval for the selected pulse train in the merge list within selected tolerances, the process proceeds to operation 1310 as described above. Otherwise, the process determines whether a pulse repetition interval for the current pulse train matches a pulse repetition interval for the selected pulse train in the merge list within selected tolerances (operation 1316). In operation 1316, the process may determine whether a difference between the pulse repetition interval for the current pulse train and the pulse repetition interval for the selected pulse train in the merge list is less than about three standard deviations for the pulse repetition interval.

If the pulse repetition interval for the current pulse train does not match the pulse repetition interval for the selected pulse train in the merge list within selected tolerances, the process proceeds to operation 1310 as described above. Otherwise, the process determines whether a pulse repetition interval offset for the current train matches a pulse repetition interval offset for the selected pulse train in the merge list within selected tolerances (operation 1318). In operation 1318, the pulse repetition interval offset may be a mean difference between pulse repetition intervals for a pulse train when the pulse train is a group of pulse trains.

If the pulse repetition interval offset for the current train does not match the pulse repetition interval offset for the selected pulse train in the merge list within selected tolerances, the process proceeds to operation 1310 as described above. Otherwise, the process merges the current pulse train with the selected pulse train in the merge list (operation 1320). In this manner, two or more pulse trains may be consolidated to form a single pulse train or train group. Thereafter, the process returns to operation 1304 as described above.

In the process described in FIGS. 13A and 13B, pulse trains listed in the merge list may be removed from the merge list when the pulse trains in the merge list are older than the current pulse train by some threshold period of time. Pulse trains that are removed from the merge list may be processed by decision process 834 in detection and classification process 800 in FIG. 8.

Figure 14A:
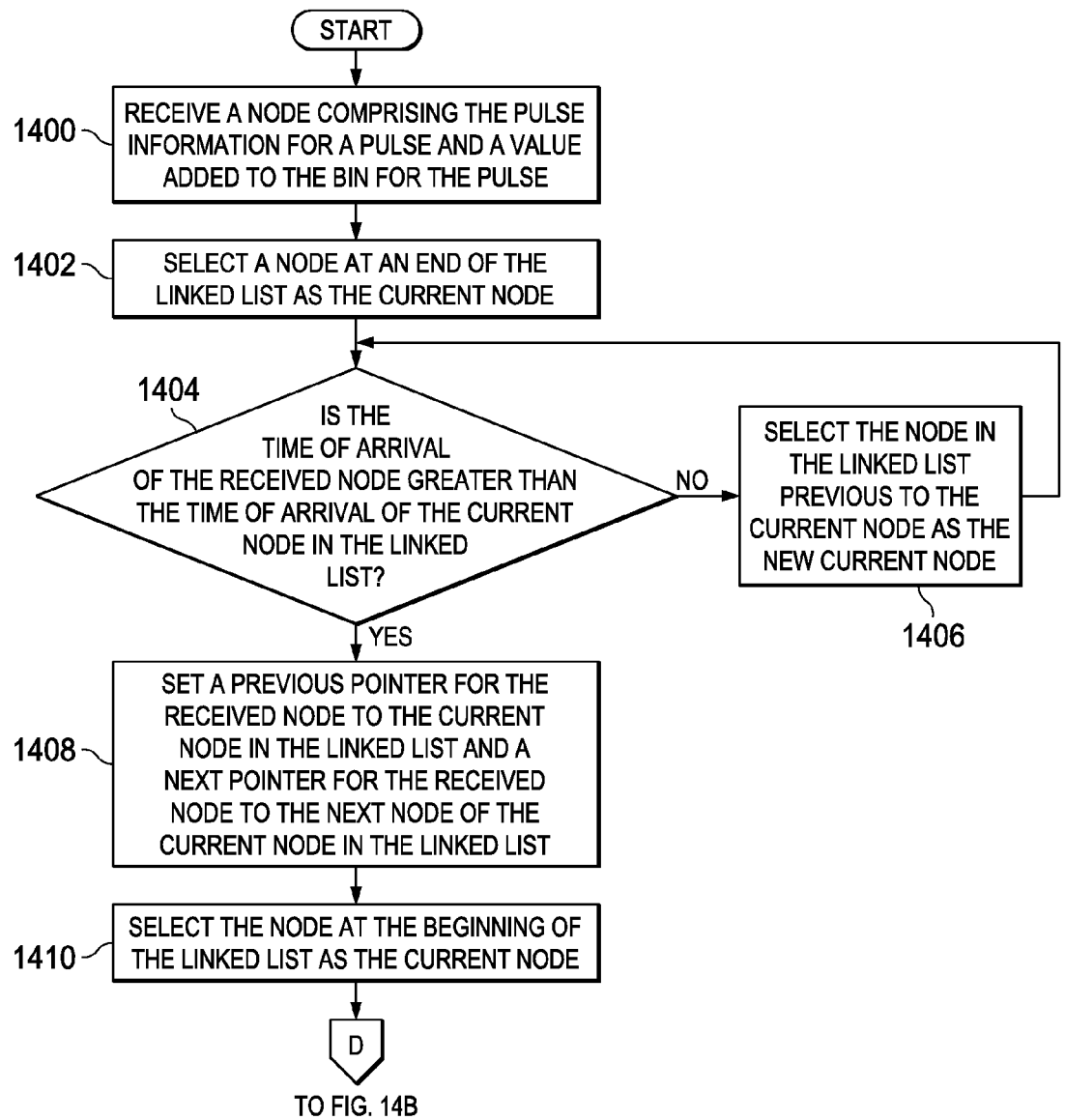
FIGS. 14A and 14B are illustrations of a process for aging a stochastic histogram in the form of a flowchart in accordance with an illustrative embodiment.
Figure 14B:
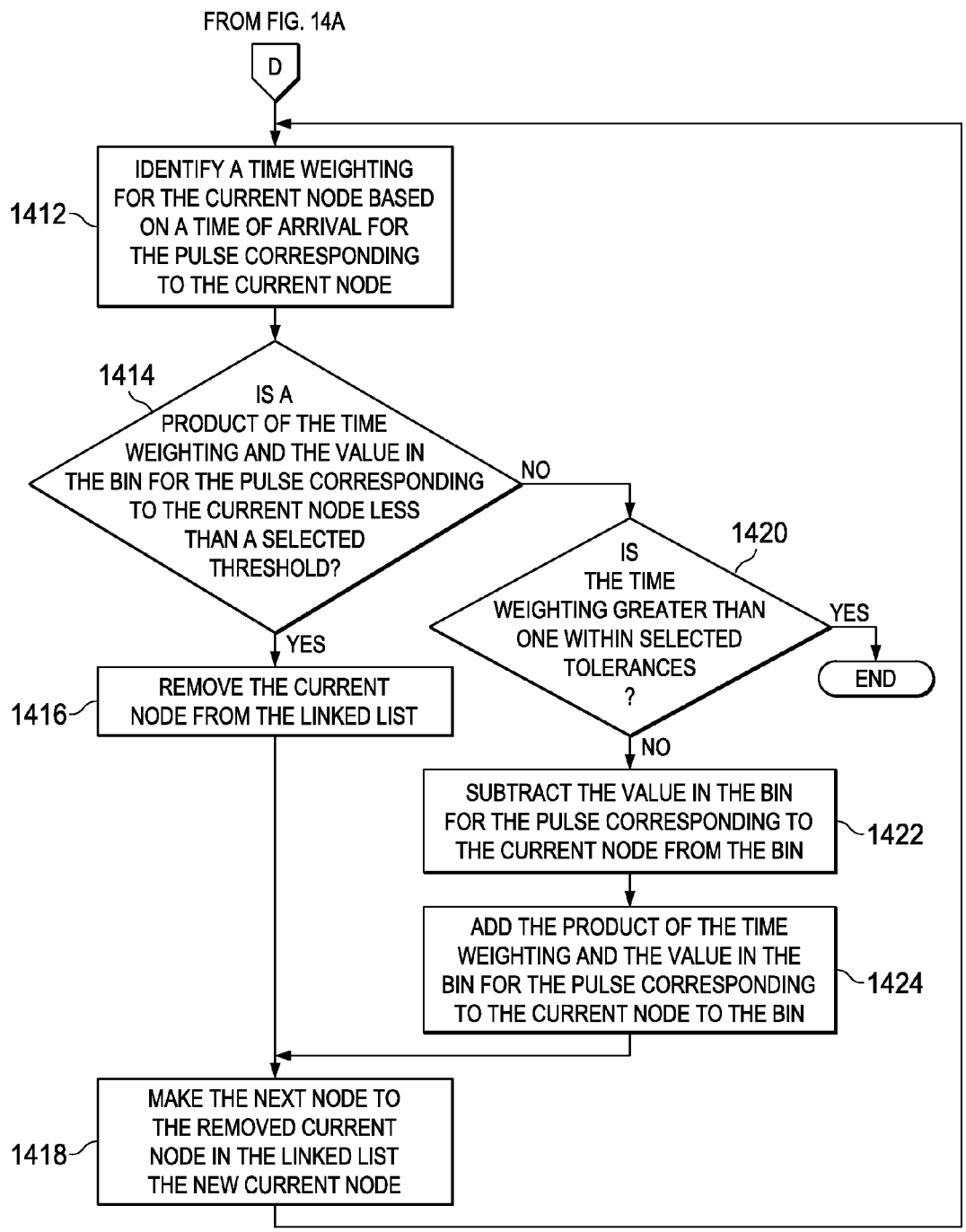

With reference now to FIGS. 14A and 14B, illustrations of a process for aging a stochastic histogram in the form of a flowchart are depicted in accordance with an illustrative embodiment. The process illustrated in FIGS. 14A and 14B may be implemented by a receiver in a receiver system, such as, for example, first receiver 213 in FIGS. 2-3, second receiver 217 in FIGS. 2-3, receiver 406 in FIG. 4, or some other suitable type of receiver. In particular, this process may be used to implement aging process 840 in FIG. 8. Further, this process may be performed for each bin in the stochastic histogram.

The process begins by receiving a node comprising the pulse information for a pulse and a value added to the bin for the pulse (operation 1400). This node may be, for example, the node created in operation 908 in FIG. 9 or the node created in operation 1014 in FIG. 10. Further, this node may be a node received for inclusion in a linked list for the aging process. The linked list may be a doubly linked list in which each node has a previous pointer for a previous node in the linked list and a next pointer for a next node in the linked list.

The process then selects a node at an end of the linked list as the current node (operation 1402). The process then determines whether the time of arrival of the received node is greater than the time of arrival of the current node in the linked list (operation 1404). If the time of arrival of the received node is not greater than the time of arrival of the current node in the linked list, the process selects the node in the linked list previous to the current node as the new current node (operation 1406), with the process then returning to operation 1404 as described above.

With reference again to operation 1404, if the time of arrival of the received node is greater than the time of arrival of the current node in the linked list, the process sets a previous pointer for the received node to the current node in the linked list and a next pointer for the received node to the next node of the current node in the linked list (operation 1408). Thereafter, the process selects the node at the beginning of the linked list as the current node (operation 1410).

The process then identifies a time weighting for the current node based on a time of arrival for the pulse corresponding to the current node (operation 1412). The process then determines whether a product of the time weighting and the value in the bin for the pulse corresponding to the current node is less than a selected threshold (operation 1414). If the product of the time weighting and the value in the bin for the pulse corresponding to the current node is less than the selected threshold, the process removes the current node from the linked list (operation 1416). Thereafter, the process makes the next node to the removed current node in the linked list the new current node (operation 1418). Next, the process proceeds to operation 1412 as described above.

With reference again to operation 1414, if the product of the time weighting and the value in the bin for the pulse corresponding to the current node is not less than the selected threshold, the process determines whether the time weighting is greater than one within selected tolerances (operation 1420). If the time weighting is greater than one within selected tolerances, the process terminates for this bin. Otherwise, the process subtracts the value in the bin for the pulse corresponding to the current node from the bin (operation 1422). The process then adds the product of the time weighting and the value in the bin for the pulse corresponding to the current node to the bin (operation 1424). Thereafter, the process returns to operation 1418 as described above.

Figure 15:
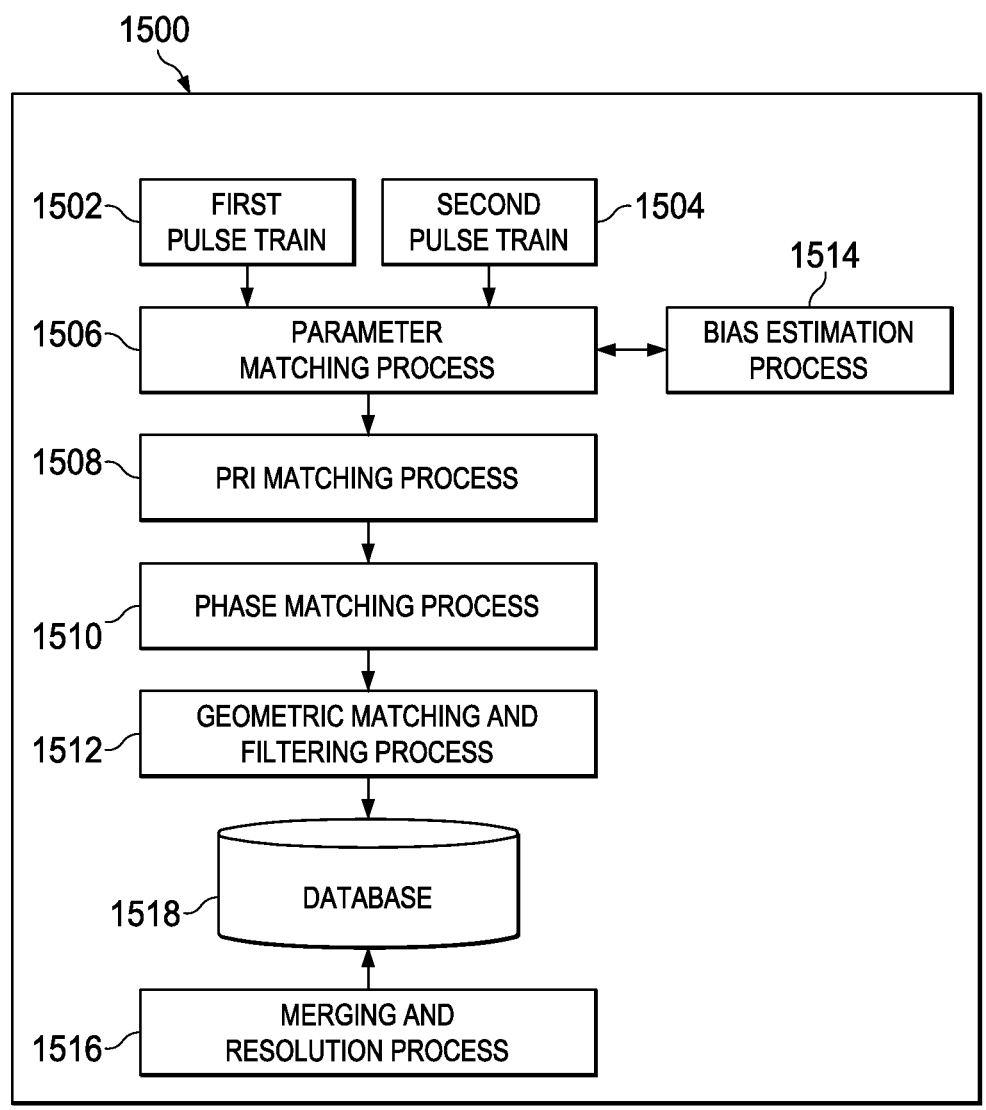
FIG. 15 is an illustration of a data flow for a cooperative detection and classification process in the form of a flowchart in accordance with an illustrative embodiment.

With reference now to FIG. 15, an illustration of a data flow for a cooperative detection and classification process in the form of a flowchart is depicted in accordance with an illustrative embodiment. In this illustrative example, cooperative detection and classification process 1500 may be performed using two or more receivers, such as, for example, a pair of receivers in a receiver system in receiver systems 204 in FIG. 2. For example, cooperative detection and classification process 1500 may be performed by any two of first receiver 213 in FIGS. 2-3, second receiver 217 in FIGS. 2-3, receiver 406 in FIG. 4, or some other suitable type of receiver.

In FIG. 15, the operations performed in cooperative detection and classification process 1500 by a particular receiver are described. Cooperative detection and classification process 1500 receives first pulse train 1502 and second pulse train 1504 as inputs. First pulse train 1502 is identified by the particular receiver using detection and classification process 800 in FIG. 8. Second pulse train 1504 is received from a second receiver.

First pulse train 1502 and second pulse train 1504 are received by cooperative detection and classification process 1500 with information about first pulse train 1502. Cooperative detection and classification process 1500 includes parameter matching process 1506, pulse repetition interval (PRI) matching process 1508, phase matching process 1510, geometric matching and filtering process 1512, bias estimation process 1514, and merging and resolution process 1516.

Parameter matching process 1506 may be configured to match continuous parameters and discrete parameters for first pulse train 1502 and second pulse train 1504. Discrete parameters may include, for example, angle of arrival, a type of modulation, a number of modulation symbols, a type of pulse compression, and/or other types of discrete parameters. Continuous parameters may include, for example, without limitation, frequency, pulse width, and other suitable types of continuous parameters. Parameter matching process 1506 may use bias estimation process 1514 to match the continuous parameters.

Pulse repetition interval matching process 1508 matches the pulse repetition intervals for first pulse train 1502 and second pulse train 1504. Phase matching process 1510 matches the phases for first pulse train 1502 and second pulse train 1504. Geometric matching and filtering process 1512 matches the geometrical parameters for first pulse train 1502 and second pulse train 1504.

The output of all of these matching processes, including geometric matching and filtering process 1512, is stored in database 1518. The output of geometric matching and filtering process 1512 may include the matched pair of first pulse train 1502 and second pulse train 1504. Further, the output of geometric matching and filtering process 1512 is used by phase matching process 1510. The output used by phase matching process 1510 may include first pulse train 1502 and/or second pulse train 1504 when these pulse trains are not matched after geometric matching and filtering process 1512 has been performed.

Bias estimation process 1514 reduces the bias between first pulse train 1502 and second pulse train 1504 to within selected tolerances. Merging and resolution process 1516 may consolidate pulse trains stored in database 1518 that belong together into one or more train groups over time. Further, merging and resolution process 1516 may remove pulse trains that do not belong together and/or to any train group from database 1518 over time.

In this manner, pulse repetition interval (PRI) matching process 1508, phase matching process 1510, geometric matching and filtering process 1512, and bias estimation process 1514 are used to cooperatively classify first pulse train 1502 and second pulse train 1504. The operations used to implement pulse repetition interval (PRI) matching process 1508, phase matching process 1510, geometric matching and filtering process 1512, and bias estimation process 1514 are described in greater detail below in FIGS. 16-20. The processes described in FIGS. 16-20 may be used to implement the different processes in cooperative detection and classification process 1500 alone or in conjunction with other processes, depending on the implementation.

Figure 16:
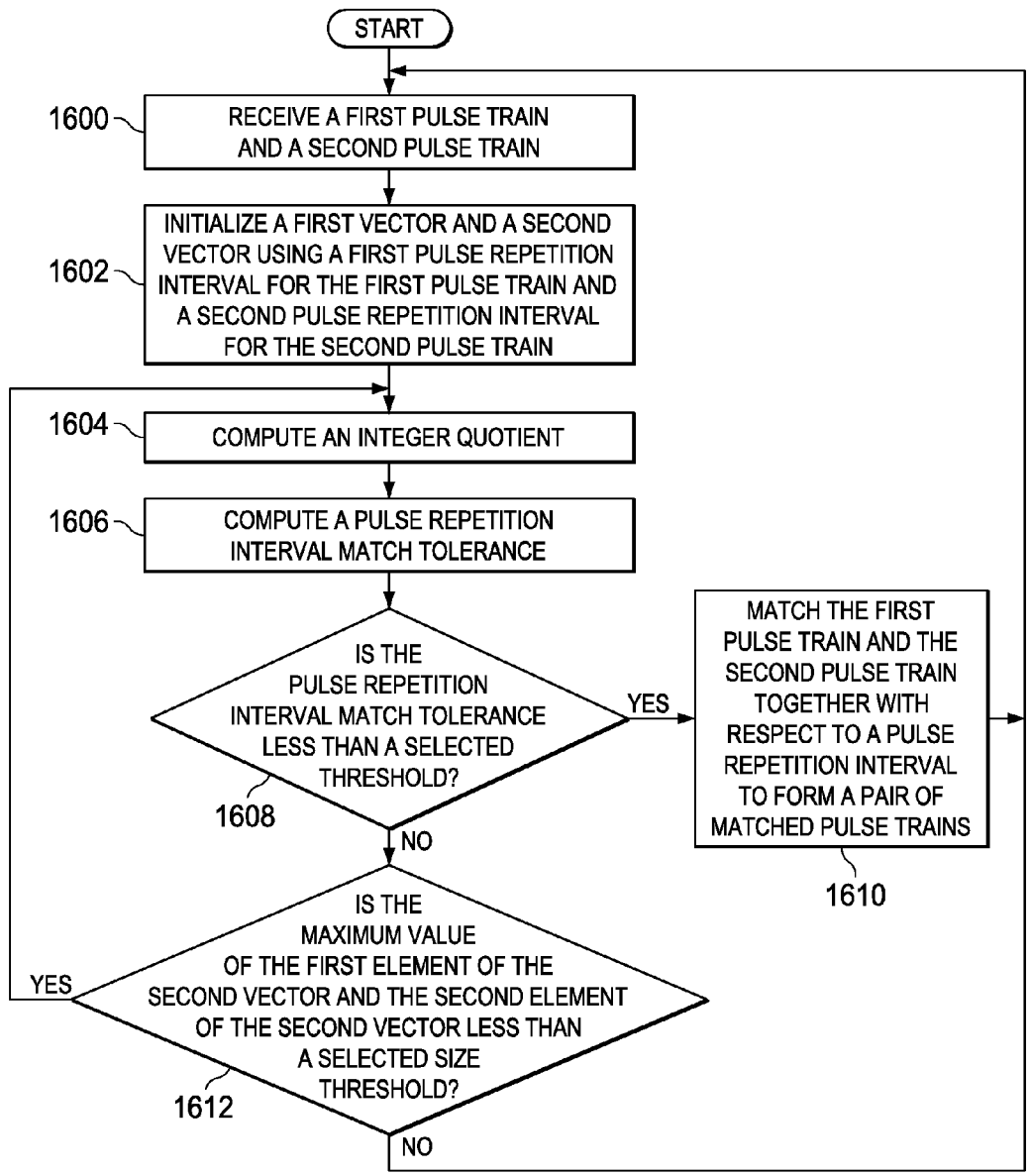
FIG. 16 is an illustration of a process for matching pulse repetition intervals in the form of a flowchart in accordance with an illustrative embodiment.

With reference now to FIG. 16, an illustration of a process for matching pulse repetition intervals in the form of a flowchart is depicted in accordance with an illustrative embodiment. The process illustrated in FIG. 16 may be implemented using a receiver in a receiver system, such as, for example, first receiver 213 in FIGS. 2-3, second receiver 217 in FIGS. 2-3, receiver 406 in FIG. 4, or some other suitable type of receiver. Further, this process may be used to implement pulse repetition interval matching process 1508 in FIG. 15.

The process begins by receiving a first pulse train and a second pulse train (operation 1600). The first pulse train and the second pulse train received in operation 1600 may be, for example, first pulse train 1502 and second pulse train 1504, respectively, in FIG. 15.

The process then initializes a first vector and a second vector using a first pulse repetition interval for the first pulse train and a second pulse repetition interval for the second pulse train (operation 1602). Operation 1602 may be performed as follows:

$$a = PRI1, \quad (12)$$

$$B = PRI2, \quad (13)$$

$$U = [1, 0, a], \text{and} \quad (14)$$

$$V = [0, 1, b], \quad (15)$$

where a and b are variables, PRI1 is the first pulse repetition interval for the first pulse train, PRI2 is the second pulse repetition interval for the second pulse train, U is the first vector, and V is the second vector.

The process then computes an integer quotient (operation 1604). In operation 1604, the process computes the following:

$$Q=U(3)/V(3), \quad (16)$$

$$Z=U-V*Q, \quad (17)$$

$$U=V \text{ and } V=Z, \quad (18)$$

where Q is the integer quotient; U(3) is the third element of the first vector, U; V(3) is the third element of the second vector, V; and Z is a new vector. In this manner, the new vector may be computed using the integer quotient and the initialized first vector and initialized second vector. Thereafter, the first vector may be set to the initialized second vector and the second vector set to the new vector, Z.

Next, the process computes a pulse repetition interval match tolerance (operation 1606). In operation 1606, the pulse repetition interval match tolerance may be computed as follows:

$$\text{PRI match tolerance}=|a*V(2)+b*V(1)| \quad (19)$$

where PRI match tolerance is the pulse repetition interval match tolerance, V(2) is the second element of the second vector, and V(1) is the first element of the second vector.

The process then determines whether the pulse repetition interval match tolerance is less than a selected threshold (operation 1608). If the pulse repetition interval match tolerance is less than the selected threshold, the process matches the first pulse train and the second pulse train together with respect to a pulse repetition interval to form a pair of matched pulse trains (operation 1610). The process returns to operation 1600 thereafter. In this illustrative example, the pair of matched pulse trains formed in operation 1610 may be sent to phase matching process 1510 in FIG. 15.

With reference again to operation 1608, if the pulse repetition interval match tolerance is not less than the selected threshold, the process determines whether the maximum value of the first element of the second vector and the second element of the second vector is less than a selected size threshold (operation 1612). If the maximum value of the first element of the second vector and the second element of the second vector is less than a selected threshold, M, the process returns to operation 1604 as described above. Otherwise, the process returns to operation 1600 as descried above.

Figure 17A:
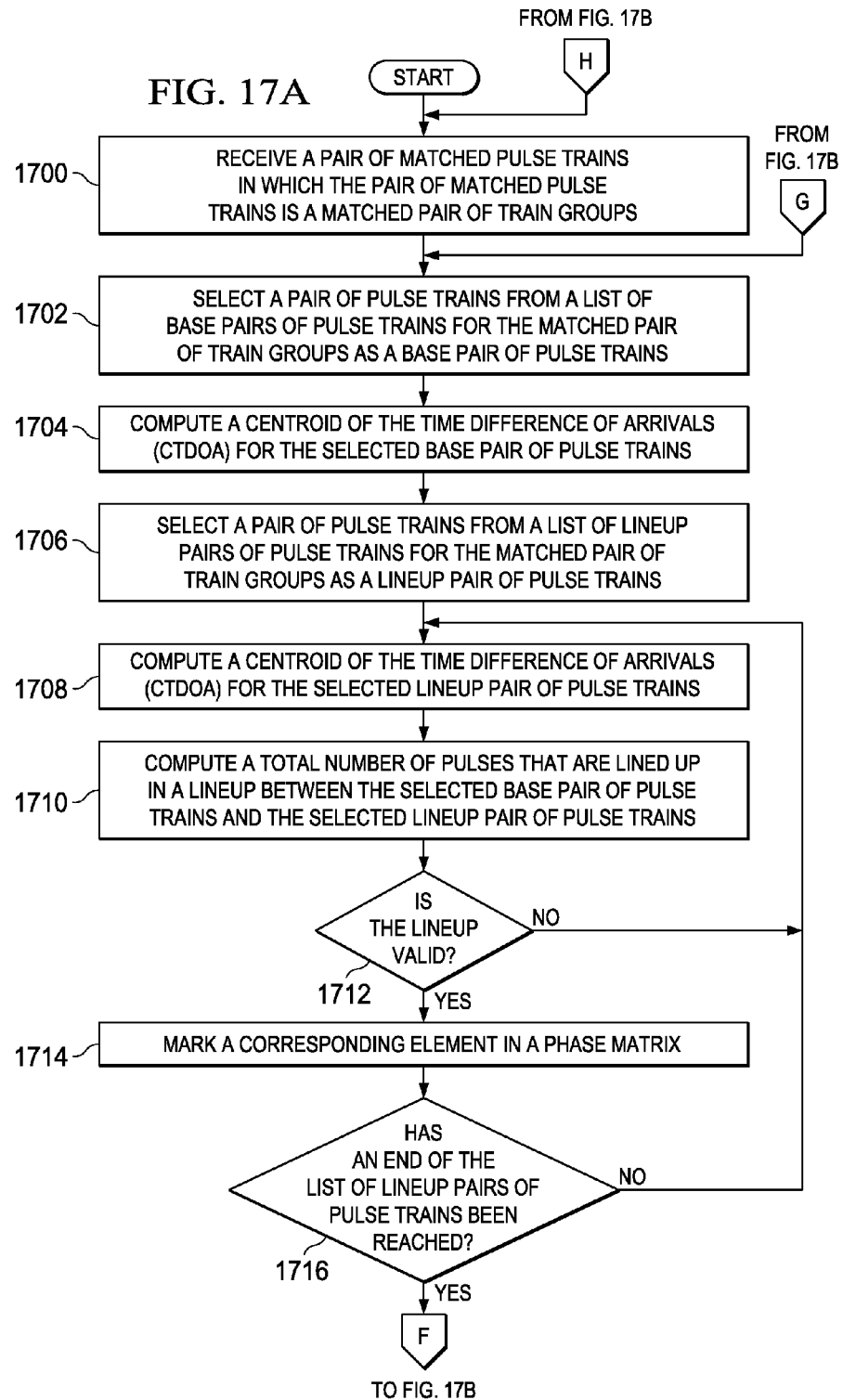
FIGS. 17A and 17B are illustrations of a process for matching phases in the form of a flowchart in accordance with an illustrative embodiment.
Figure 17B:
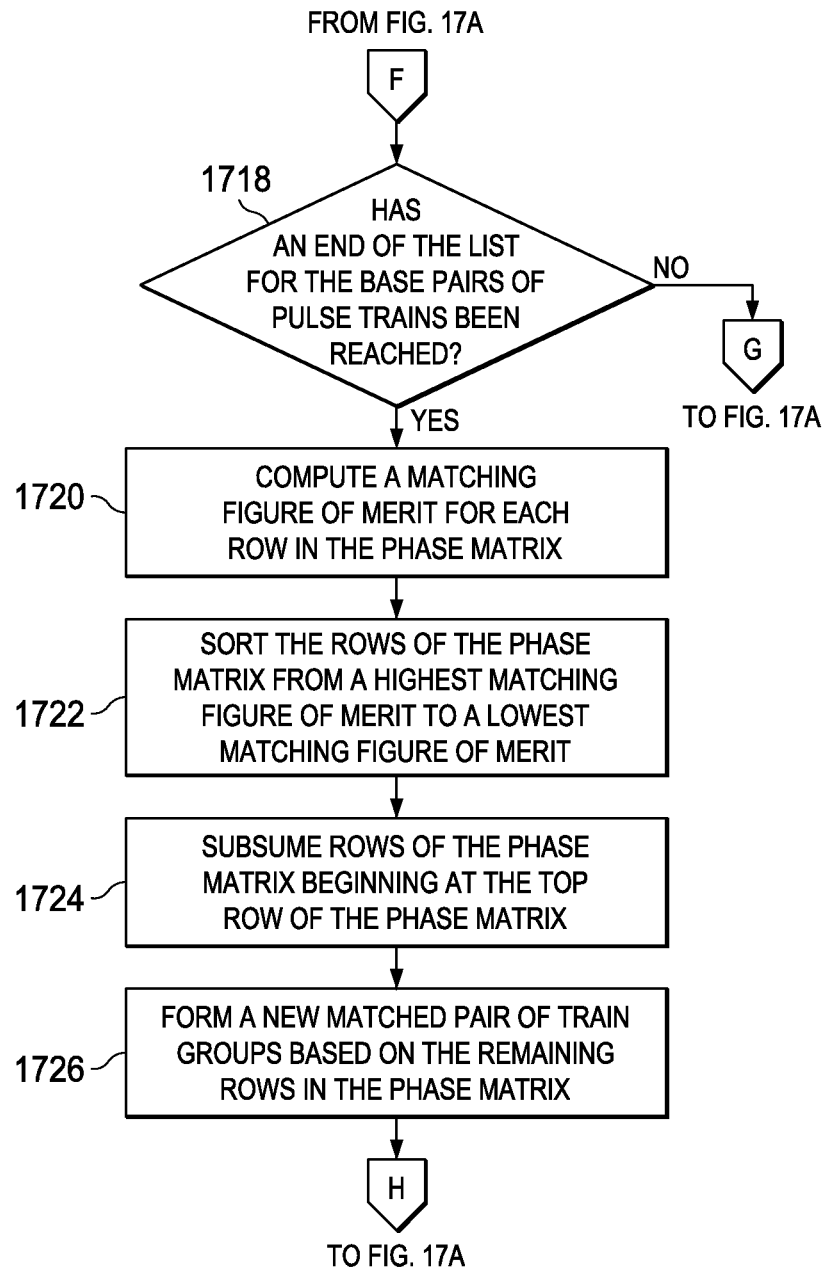

With reference now to FIGS. 17A and 17B, illustrations of a process for matching phases in the form of a flowchart are depicted in accordance with an illustrative embodiment. The process illustrated in FIGS. 17A and 17B may be implemented using a receiver in a receiver system, such as, for example, first receiver 213 in FIGS. 2-3, second receiver 217 in FIGS. 2-3, receiver 406 in FIG. 4, or some other suitable type of receiver.

Further, this process may be used to implement phase matching process 1510 in FIG. 15. The process described in FIG. 15 may be implemented to match phases for two pulse trains each comprising a group of pulse trains. For example, the process described in FIG. 15 may be used to match phases for first pulse train 1502 and second pulse train 1504 in FIG. 15 when each of first pulse train 1502 and second pulse train 1504 is a train group formed by two or more pulse trains.

The process begins by receiving a pair of matched pulse trains in which the pair of matched pulse trains is a matched pair of train groups (operation 1700). The matched pair of train groups, $\mathcal{T}, \mathcal{U}$, may be the pair of matched pulse trains formed in operation 1610 in FIG. 16.

The process selects a pair of pulse trains from a list of base pairs of pulse trains for the matched pair of train groups as a base pair of pulse trains (operation 1702). In operation 1702, the selected base pair of pulse trains includes a first pulse train, $T_1$, from the first train group in the matched pair of train groups and a second pulse train, $U_1$, from the second train group in the matched pair of train groups.

The process then computes a centroid of the time difference of arrivals (CTDOA) for the selected base pair of pulse trains (operation 1704). This centroid of the time difference of arrivals for a pair of pulse trains is defined as follows:

$$\text{CTDOA}(T_1,U_1)=m\text{CTOA}(T_1)-m\text{CTOA}(U_1) \quad (20)$$

where $\text{CTDOA}(T_1,U_1)$ is the centroid of the time difference of arrivals for the $T_1,U_1$ pair of pulse trains and mCTOA is a shifted centroid time of arrival (CTOA) for a pulse train in which the centroid time of arrival is shifted such that the centroid lands on or near a middle pulse in the pulse train.

Next, the process selects a pair of pulse trains from a list of lineup pairs of pulse trains for the matched pair of train groups as a lineup pair of pulse trains (operation 1706). The selected lineup pair of pulse trains includes a first pulse train, $T_2$, from the first train group in the matched pair of train groups and a second pulse train, $U_2$, from the second train group in the matched pair of train groups.

The process then computes a centroid of the time difference of arrivals (CTDOA) for the selected lineup pair of pulse trains (operation 1708). This centroid of the time difference of arrivals for a pair of pulse trains is defined as follows:

$$\text{CTDOA}(T_2,U_2)=m\text{CTOA}(T_2)-m\text{CTOA}(U_2) \quad (21)$$

where $\text{CTDOA}(T_2,U_2)$ is the centroid of the time difference of arrivals for the $T_2,U_2$ pair of pulse trains.

Next, the process computes a total number of pulses that are lined up in a lineup between the selected base pair of pulse trains and the selected lineup pair of pulse trains (operation 1710).

The process then determines whether the lineup is valid (operation 1712). In other words, in operation 1712, the process determines whether the selected base pair of pulse trains and the selected lineup pair of pulse trains match within selected tolerances. Operation 1712 may be performed using a matching figure of merit (MFOM). The matching figure of merit may be computed as follows:

$$MFOM(T_1, U_1, T_2, U_2) = 1-2Q\left(\frac{|<(CTDOA(T_1,U_1)-CTDOA(T_2,U_2))/PRI>|}{\sqrt{\sigma_{T_1}^2+\sigma_{U_1}^2+\sigma_{T_2}^2+\sigma_{U_2}^2}}\right) \quad (22)$$

where $$Q(x)=\frac{1}{2}\text{erfc}(x/\sqrt{2}). \quad (23)$$

The two pairs of pulse trains, the selected base pair of pulse trains, and the selected lineup pair of pulse trains are matched if the matching figure of merit meets a selected matching threshold. In other words, the lineup of the two pairs of pulse trains is valid if the matching figure of merit meets a selected matching threshold. Two pairs of pulse trains that are matched may be transmitted from a same source.

If the lineup of the two pairs of pulse trains is not valid, the process returns to operation 1708 as referenced above. Otherwise, if the lineup of the two pairs of pulse trains is valid, the process marks a corresponding element in a phase matrix (operation 1714). Each row in the phase matrix corresponds to a base pair of pulse trains in the list of base pairs of pulse trains. Each column in the phase matrix corresponds to a lineup pair of pulse trains in the list of lineup pairs of pulse trains. Each element at an intersection of a row and a column in the phase matrix corresponds to a lineup between the corresponding base pair of pulse trains and corresponding lineup pair of pulse trains.

The process then determines whether an end of the list of lineup pairs of pulse trains has been reached (operation 1716). If the end of the list of lineup pairs of pulse trains has not been reached, the process returns to operation 1708 as described above.

Otherwise, the process determines whether an end of the list for the base pairs of pulse trains has been reached (operation 1718). If the end of the list for the base pairs of pulse trains has not been reached, the process returns to operation 1702 as described above. Otherwise, the process computes a matching figure of merit for each row in the phase matrix (operation 1720). A matching figure of merit for each row in the phase matrix is a matching figure of merit for the matched pair of train groups, $\mathcal{T}$ and $\mathcal{U}$, against a corresponding base pair of pulse trains, $T_1, U_1$. The matching figure of merit for a row in the phase matrix may be defined as follows:

$$MFOM(T_1, U_1, \mathcal{T}, \mathcal{U}) | = \frac{\sum_{i,j\_matched} MFOM(T_1, U_1, T_i, U_j)}{\#lineups} \quad (24)$$

where #lineups is the number of pulses that line up in the train groups $\mathcal{T}$ and $\mathcal{U}$, given the lineup of the base pair of trains $T_1$ and $U_1$.

The process then sorts the rows of the phase matrix from a highest matching figure of merit to a lowest matching figure of merit (operation 1722). Thereafter, the process subsumes rows of the phase matrix beginning at the top row of the phase matrix (operation 1724). In other words, the top row is compared to each of the subsequent rows in the phase matrix. Any rows having matches only in places where the top row has matches are subsumed. A row that is subsumed is deleted. The process forms a new matched pair of train groups based on the remaining rows in the phase matrix (operation 1726), with the process then returning to operation 1700 as described above.

Figure 18:
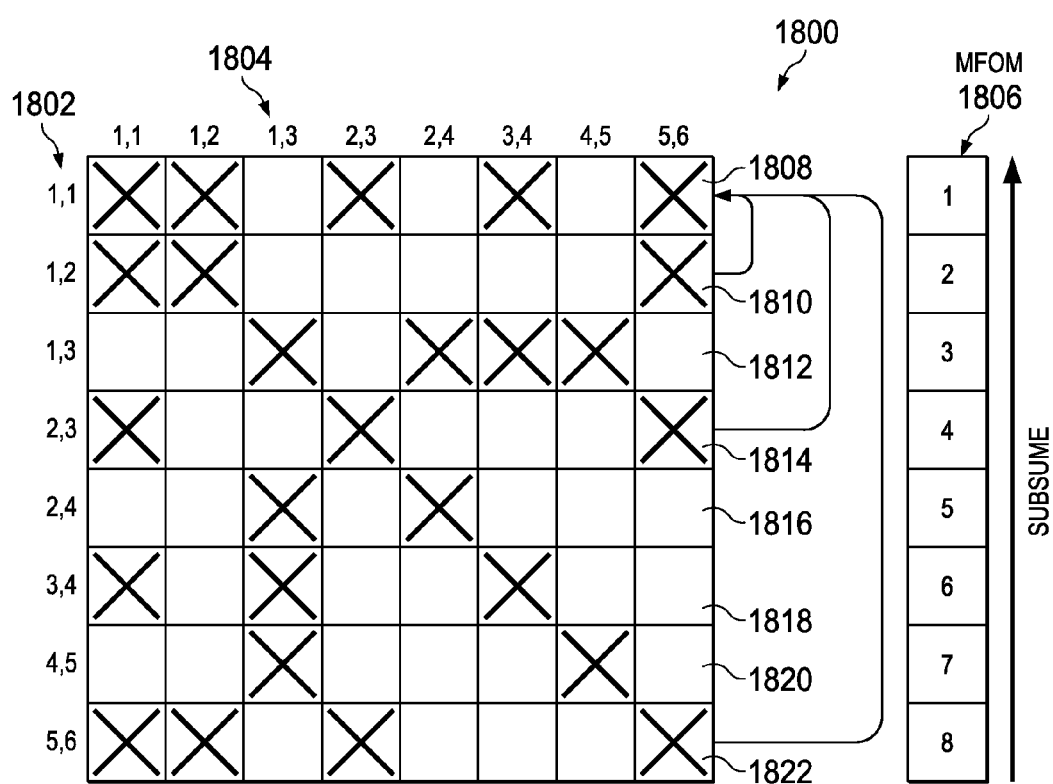
FIG. 18 is an illustration of a phase matrix for matching pulse trains in train groups detected by two different receivers in accordance with an illustrative embodiment.

With reference now to FIG. 18, an illustration of a phase matrix for matching pulse trains in train groups detected by two different receivers is depicted in accordance with an illustrative embodiment. In this illustrative example, phase matrix 1800 is an example of one implementation for the phase matrix described in FIGS. 17A and 17B. As depicted, phase matrix 1800 has rows 1802 and columns 1804. Rows 1802 correspond to base pairs in a list of base pairs of pulse trains. Columns 1804 correspond to lineup pairs in a list of lineup pairs of pulse trains.

Rows 1802 of phase matrix 1800 are sorted by matching figure of merits 1806. In this illustrative example, pairs of pulse trains that have been matched are marked or indicated by an "X" at the intersection of a row and a column. Rows 1802 may be subsumed as described in operation 1724 in FIG. 17B. In this illustrative example, rows 1802 include first row 1808, second row 1810, third row 1812, fourth row 1814, fifth row 1816, sixth row 1818, seventh row 1820, and eighth row 1822. As depicted, second row 1810, fourth row 1814, and eighth row 1822 are subsumed into first row 1808.

Figure 19:
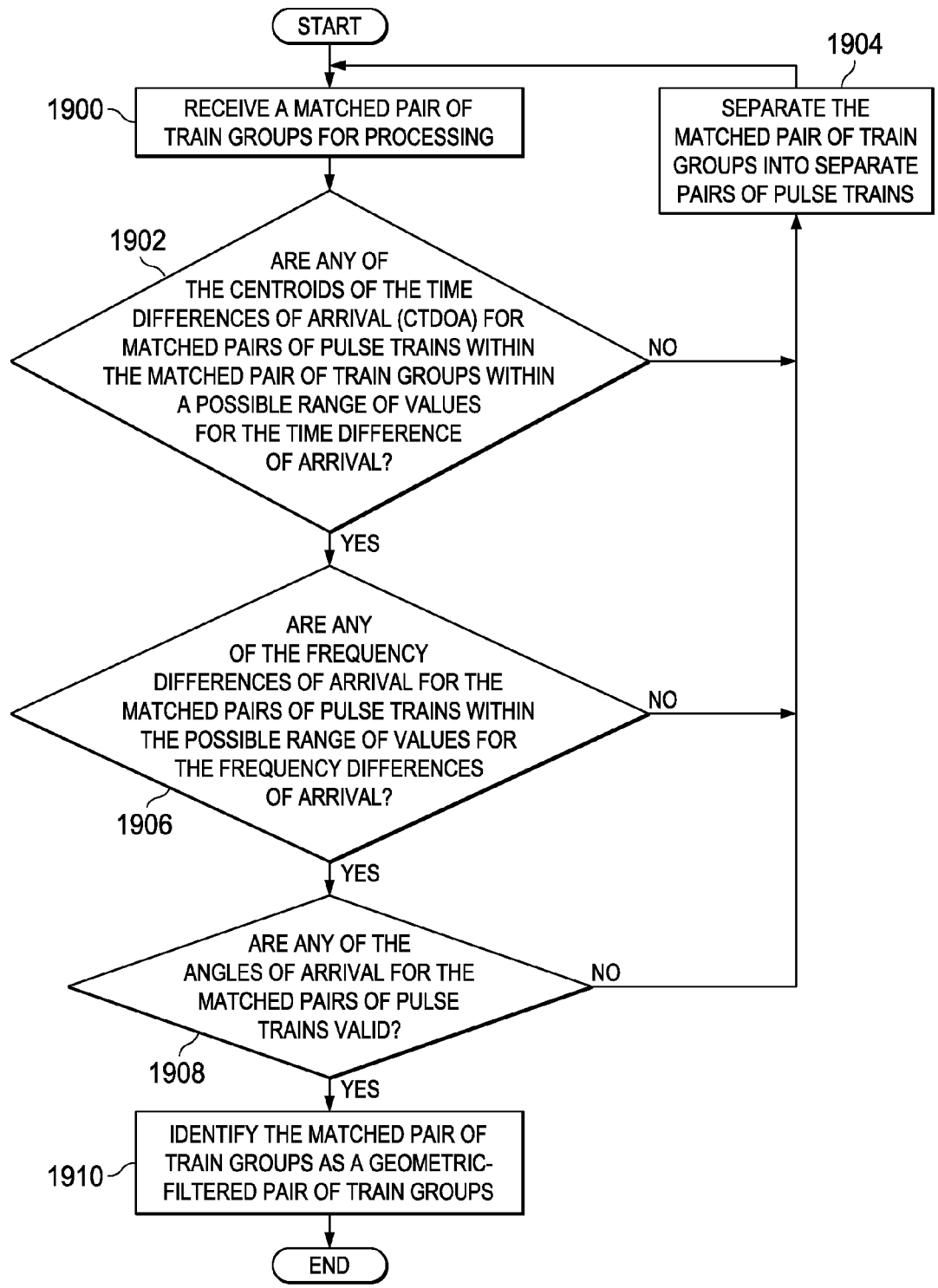
FIG. 19 is an illustration of a process for geometric matching and filtering in the form of a flowchart in accordance with an illustrative embodiment.

With reference now to FIG. 19, an illustration of a process for geometric matching and filtering in the form of a flowchart is depicted in accordance with an illustrative embodiment. The process illustrated in FIG. 19 may be implemented using a receiver in a receiver system, such as, for example, first receiver 213 in FIGS. 2-3, second receiver 217 in FIGS. 2-3, receiver 406 in FIG. 4, or some other suitable type of receiver. Further, this process may be used to implement geometric matching and filtering process 1512 in FIG. 15.

The process receives a matched pair of train groups for processing (operation 1900). The matched pair of train groups may be, for example, the new matched pair of train groups formed in operation 1726 in FIG. 17B.

Next, the process determines whether any of the centroids of the time differences of arrival (CTDOA) for matched pairs of pulse trains within the matched pair of train groups is within a possible range of values for the time difference of arrival (operation 1902). This range of values is defined by geometric consideration. If no centroids of the time differences of arrival for the matched pairs of pulse trains are within the possible range of values for the time difference of arrival, the process separates the matched pair of train groups into separate pairs of pulse trains (operation 1904). The process then returns to operation 1900 as described above.

Returning to operation 1902, if any centroids of the time differences of arrival for the matched pair of pulse trains are within the possible range of values for the time difference of arrival, the process determines whether any of the frequency differences of arrival for the matched pairs of pulse trains are within the possible range of values for the frequency differences of arrival (operation 1906). If no frequency differences of arrival for the selected pair of pulse trains are within the range of possible values for the frequency difference of arrival, the process returns to operation 1904 as described above.

Otherwise, the process determines whether any of the angles of arrival for the matched pairs of pulse trains are valid (operation 1908). If no angles of arrival for the matched pairs of pulse trains are valid, the process returns to operation 1904 as described above. Otherwise, the process identifies the matched pair of train groups as a geometric-filtered pair of train groups (operation 1910), with the process terminating thereafter.

Figure 20:
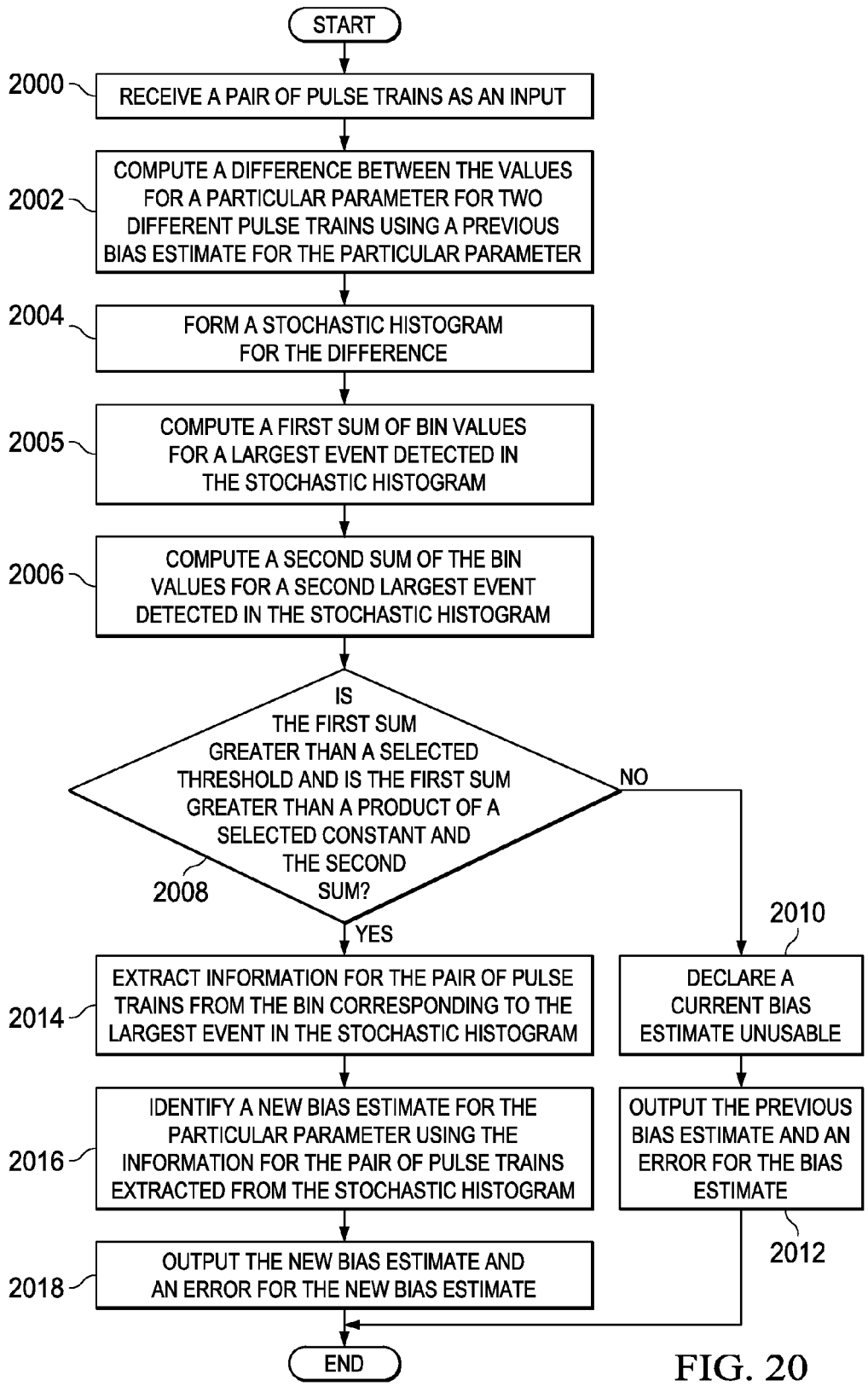
FIG. 20 is an illustration of a process for reducing bias when matching parameters in the form of a flowchart in accordance with an illustrative embodiment.

With reference now to FIG. 20, an illustration of a process for reducing bias when matching parameters in the form of a flowchart is depicted in accordance with an illustrative embodiment. The process illustrated in FIG. 20 may be implemented using a receiver in a receiver system, such as, for example, first receiver 213 in FIGS. 2-3, second receiver 217 in FIGS. 2-3, receiver 406 in FIG. 4, or some other suitable type of receiver.

Further, this process may be used to implement bias estimation process 1514 in FIG. 15. In particular, this process may be implemented to reduce and/or remove the bias between measurements of values for parameters for pulses from different receivers. This process may be performed for each parameter being matched by parameter matching process 1506 in FIG. 15.

The process begins by receiving a pair of pulse trains as an input (operation 2000). The pair of pulse trains may be received from, for example, without limitation, parameter matching process 1506 in FIG. 15. The process computes a difference between the values for a particular parameter for two different pulse trains using a previous bias estimate for the particular parameter (operation 2002). Next, the process forms a stochastic histogram for the difference (operation 2004).

Thereafter, the process computes a first sum of bin values for a largest event detected in the stochastic histogram (operation 2005). The largest event may be, for example, one or more bins having the largest bin values. The process also computes a second sum of the bin values for a second largest event detected in the stochastic histogram (operation 2006).

The process then determines whether the first sum is greater than a selected threshold and whether the first sum is greater than a product of a selected constant and the second sum (operation 2008).

If the first sum is not greater than the selected threshold or the first sum is not greater than the product of the selected constant and the second sum, the process declares a current bias estimate unusable (operation 2010). In other words, in operation 2010, the previous bias estimate is not updated with the current bias estimate. The process then outputs the previous bias estimate and an error for the bias estimate (operation 2012), with the process terminating thereafter. This previous bias estimate and the error for the bias estimate may be returned to, for example, parameter matching process 1506 in FIG. 15.

With reference again to operation 2008, if the first sum is greater than the selected threshold and the first sum is greater than the product of the selected constant and the second sum, the process may extract information for the pair of pulse trains from the bin corresponding to the largest event in the stochastic histogram (operation 2014). Thereafter, the process identifies a new bias estimate for the particular parameter using the information for the pair of pulse trains extracted from the stochastic histogram (operation 2016). In some cases, operation 2016 may be performed using a priori information, such as, for example, known biases for certain types of emitters.

The process then outputs the new bias estimate and an error for the new bias estimate (operation 2018), with the process terminating thereafter. This new bias estimate and the error for the bias estimate may be returned to, for example, parameter matching process 1506 in FIG. 15.

Figure 21:
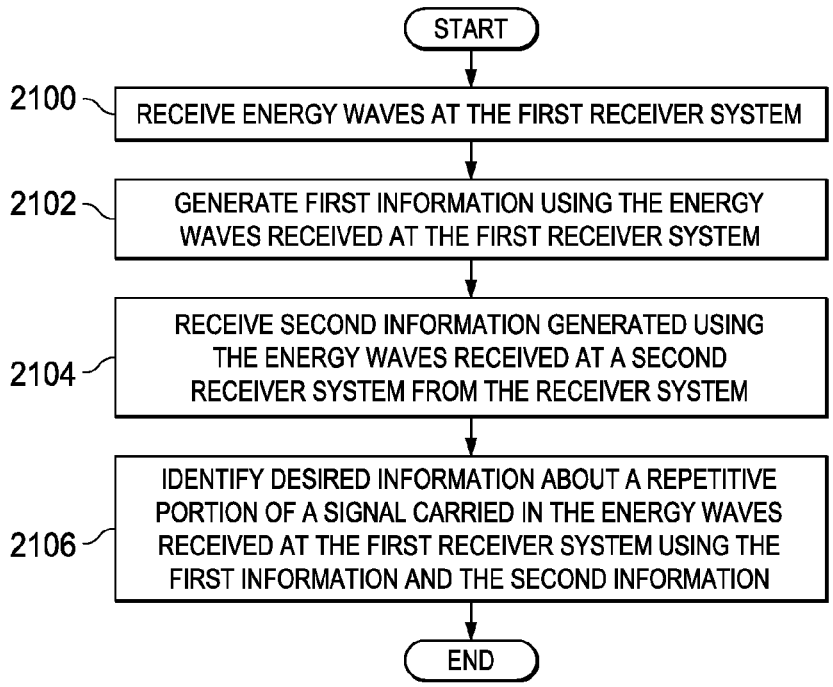
FIG. 21 is an illustration of a process for detecting signals in the form of a flowchart in accordance with an illustrative embodiment.

With reference now to FIG. 21, an illustration of a process for detecting signals in the form of a flowchart is depicted in accordance with an illustrative embodiment. The process illustrated in FIG. 21 may be implemented in signal processing environment 200 in FIG. 2. In particular, this process may be implemented by first receiver system 210 in FIG. 2.

The process begins by receiving energy waves at the first receiver system (operation 2100). The process then generates first information using the energy waves received at the first receiver system (operation 2102). The process then receives second information generated using the energy waves received at a second receiver system from the receiver system (operation 2104).

Thereafter, the process identifies desired information about a repetitive portion of a signal carried in the energy waves received at the first receiver system using the first information and the second information (operation 2106), with the process terminating thereafter. In identifying the desired information about the repetitive portion of the signal in operation 2106, the first receiver system detects the repetitive portion of the signal. In this illustrative example, the desired information may include parameters for the repetitive portion of the signal.

Figure 22:
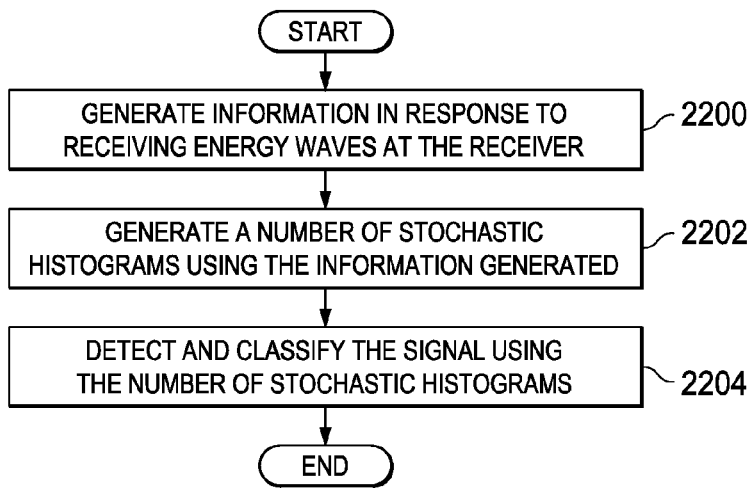
FIG. 22 is an illustration of a process for detecting and classifying signals in the form of a flowchart in accordance with an illustrative embodiment.

With reference now to FIG. 22, an illustration of a process for detecting and classifying signals in the form of a flowchart is depicted in accordance with an illustrative embodiment. The process illustrated in FIG. 22 may be implemented in signal processing environment 200 in FIG. 2. In particular, this process may be implemented using first receiver system 210 and second receiver system 212 in FIG. 2.

The process begins by a receiver in a receiver system generating information in response to receiving energy waves at the receiver (operation 2200). The information may be, for example, samples of the electrical signal into which the received energy waves were converted by the receiver system.

The receiver then generates a number of stochastic histograms using the information generated (operation 2202). Operation 2202 may be implemented using detection and classification process 800 in FIG. 8. The receiver then detects and classifies the signal using the number of stochastic histograms (operation 2204), with the process terminating thereafter.

In operation 2204, the receiver uses the number of stochastic histograms to identify a pulse train. In one illustrative example, the receiver may classify the pulse train using the information provided in the number of stochastic histograms. In another illustrative example, the receiver may use the pulse train and another pulse train received from a different receiver in a different receiver system to classify the pulse train. For example, the receiver may use matching processes to match the two pulse trains.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 23:
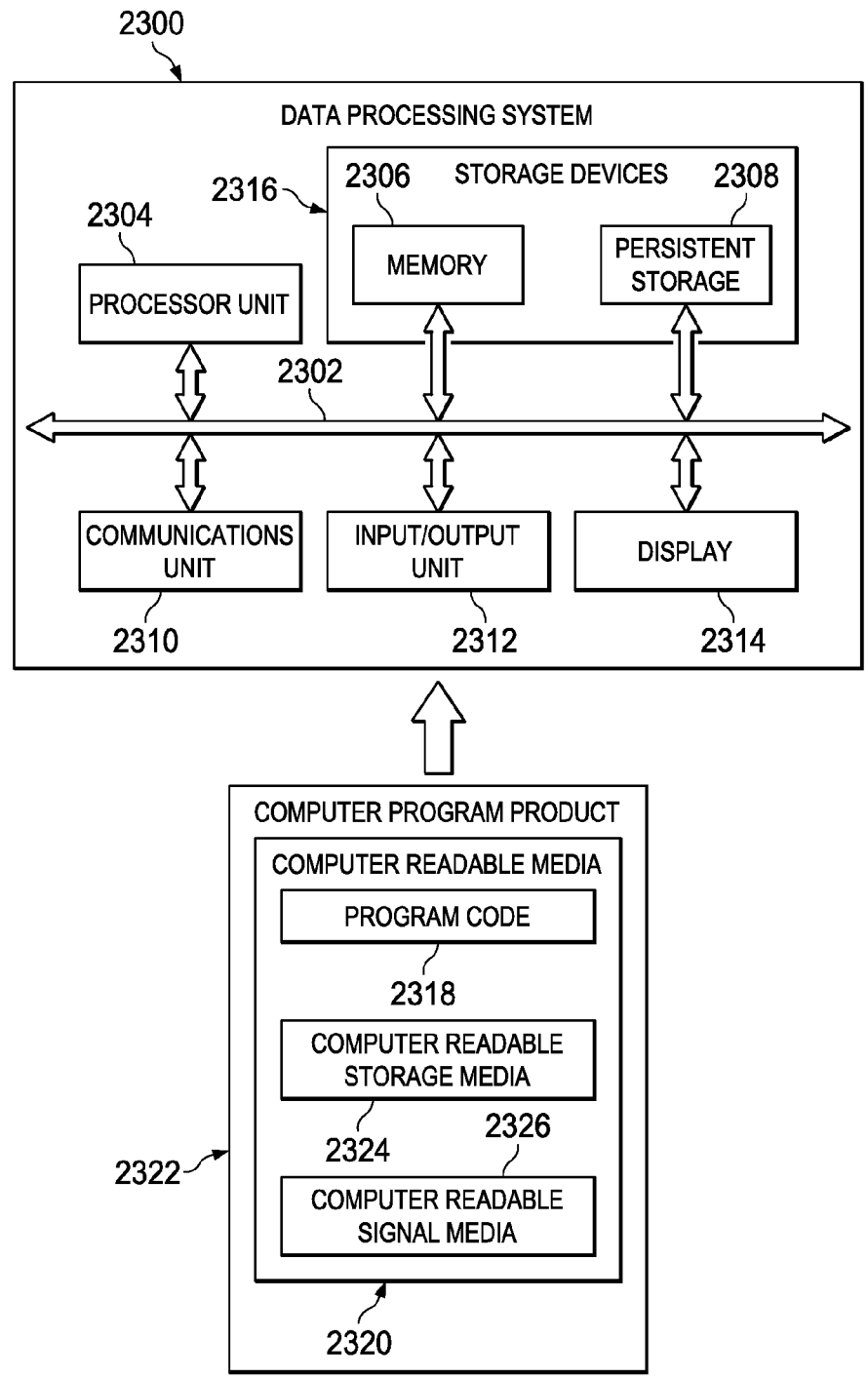
FIG. 23 is an illustration of a data processing system in accordance with an illustrative embodiment.

Turning now to FIG. 23, an illustration of a data processing system is depicted in accordance with an illustrative embodiment. Data processing system 2300 may be used to implement one or more components in signal processing system 302 and/or signal processing system 306 in FIG. 3. Further, data processing system 2300 may be used to implement processing unit 414 and/or cooperative processing module 418 in FIG. 4.

In this illustrative example, data processing system 2300 includes communications framework 2302, which provides communications between processor unit 2304, memory 2306, persistent storage 2308, communications unit 2310, input/output (I/O) unit 2312, and display 2314.

Processor unit 2304 serves to execute instructions for software that may be loaded into memory 2306. Processor unit 2304 may be a number of processors, a multi-processor core, or some other type of processor, depending on the particular implementation. A number, as used herein with reference to an item, means one or more items. Further, processor unit 2304 may be implemented using a number of heterogeneous processor systems in which a main processor is present with secondary processors on a single chip. As another illustrative example, processor unit 2304 may be a symmetric multi-processor system containing multiple processors of the same type.

Memory 2306 and persistent storage 2308 are examples of storage devices 2316. A storage device is any piece of hardware that is capable of storing information, such as, for example, without limitation, data, program code in functional form, and/or other suitable information either on a temporary basis and/or a permanent basis. Storage devices 2316 may also be referred to as computer readable storage devices in these examples. Memory 2306, in these examples, may be, for example, a random access memory or any other suitable volatile or non-volatile storage device. Persistent storage 2308 may take various forms, depending on the particular implementation.

For example, persistent storage 2308 may contain one or more components or devices. For example, persistent storage 2308 may be a hard drive, a flash memory, a rewritable optical disk, a rewritable magnetic tape, or some combination of the above. The media used by persistent storage 2308 also may be removable. For example, a removable hard drive may be used for persistent storage 2308.

Communications unit 2310, in these examples, provides for communications with other data processing systems or devices. In these examples, communications unit 2310 is a network interface card. Communications unit 2310 may provide communications through the use of either or both physical and wireless communications links.

Input/output unit 2312 allows for input and output of data with other devices that may be connected to data processing system 2300. For example, input/output unit 2312 may provide a connection for user input through a keyboard, a mouse, and/or some other suitable input device. Further, input/output unit 2312 may send output to a printer. Display 2314 provides a mechanism to display information to a user.

Instructions for the operating system, applications, and/or programs may be located in storage devices 2316, which are in communication with processor unit 2304 through communications framework 2302. In these illustrative examples, the instructions are in a functional form on persistent storage 2308. These instructions may be loaded into memory 2306 for execution by processor unit 2304. The processes of the different embodiments may be performed by processor unit 2304 using computer-implemented instructions, which may be located in a memory, such as memory 2306.

These instructions are referred to as program code, computer usable program code, or computer readable program code that may be read and executed by a processor in processor unit 2304. The program code in the different embodiments may be embodied on different physical or computer readable storage media, such as memory 2306 or persistent storage 2308.

Program code 2318 is located in a functional form on computer readable media 2320 that is selectively removable and may be loaded onto or transferred to data processing system 2300 for execution by processor unit 2304. Program code 2318 and computer readable media 2320 form computer program product 2322 in these examples. In one example, computer readable media 2320 may be computer readable storage media 2324 or computer readable signal media 2326.

Computer readable storage media 2324 may include, for example, an optical or magnetic disk that is inserted or placed into a drive or other device that is part of persistent storage 2308 for transfer onto a storage device, such as a hard drive, that is part of persistent storage 2308. Computer readable storage media 2324 also may take the form of a persistent storage, such as a hard drive, a thumb drive, or a flash memory, that is connected to data processing system 2300. In some instances, computer readable storage media 2324 may not be removable from data processing system 2300.

In these examples, computer readable storage media 2324 is a physical or tangible storage device used to store program code 2318 rather than a medium that propagates or transmits program code 2318. Computer readable storage media 2324 is also referred to as a computer readable tangible storage device or a computer readable physical storage device. In other words, computer readable storage media 2324 is a media that can be touched by a person.

Alternatively, program code 2318 may be transferred to data processing system 2300 using computer readable signal media 2326. Computer readable signal media 2326 may be, for example, a propagated data signal containing program code 2318. For example, computer readable signal media 2326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 2318 may be downloaded over a network to persistent storage 2308 from another device or data processing system through computer readable signal media 2326 for use within data processing system 2300. For instance, program code stored in a computer readable storage medium in a server data processing system may be downloaded over a network from the server to data processing system 2300. The data processing system providing program code 2318 may be a server computer, a client computer, or some other device capable of storing and transmitting program code 2318.

The different components illustrated for data processing system 2300 are not meant to provide architectural limitations to the manner in which different embodiments may be implemented. The different illustrative embodiments may be implemented in a data processing system including components in addition to or in place of those illustrated for data processing system 2300. Other components shown in FIG. 23 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 2304 may take the form of a hardware unit that has circuits that are manufactured or configured for a particular use. This type of hardware may perform operations without needing program code to be loaded into a memory from a storage device to be configured to perform the operations.

For example, when processor unit 2304 takes the form of a hardware unit, processor unit 2304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 2318 may be omitted, because the processes for the different embodiments are implemented in a hardware unit.

In still another illustrative example, processor unit 2304 may be implemented using a combination of processors found in computers and hardware units. Processor unit 2304 may have a number of hardware units and a number of processors that are configured to run program code 2318. With this depicted example, some of the processes may be implemented in the number of hardware units, while other processes may be implemented in the number of processors.

In another example, a bus system may be used to implement communications framework 2302 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 2306, or a cache, such as found in an interface and memory controller hub, that may be present in communications framework 2302.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for detecting and classifying a signal, the method comprising:
    converting, using a transducer, energy waves in which the signal is carried into an electrical signal;
    generating, by a receiver in a receiver system, information in response to receiving the electrical signal using pulses and pulse information comprising values for a number of parameters for the pulses, wherein the information is generated using a complex ambiguity function to form a correlation with respect at least one of a differential time offset or a differential frequency offset between information generated and information received by another receiver, and wherein a repetitive portion of the signal carried in the energy waves is detected using the correlation;
    generating, by the receiver, a number of stochastic histograms using the information generated;
    accumulating a circular stochastic histogram in the number of stochastic histograms for a parameter in the number of parameters using values for the parameter for the pulses, wherein the parameter is a circular parameter selected from one of an angle of arrival, a phase difference of arrival, or a longitude; and
    detecting and classifying, by the receiver, the signal using the number of stochastic histograms and the parameter.

2. The method of claim 1, wherein the step of generating, by the receiver in the receiver system, the information in response to receiving the energy waves at the receiver system comprises:
    responsive to receiving the energy waves at the receiver system, converting the energy waves into an electrical signal;
    sampling the electrical signal to generate samples; and
    wherein the pulses and the pulse information about the pulses are identified using the samples.

3. The method of claim 2, wherein the step of generating, by the receiver, the number of stochastic histograms using the information generated comprises:
    accumulating the number of stochastic histograms for the number of parameters for the pulses using the pulse information, wherein each stochastic histogram in the number of stochastic histograms is for the parameter in the number of parameters; and
    detecting a number of events using the number of stochastic histograms in which each of the number of events is detected in a corresponding stochastic histogram in the number of stochastic histograms.

4. The method of claim 3, wherein the step of detecting and classifying, by the receiver, the signal using the number of stochastic histograms comprises:
    identifying a pulse train that corresponds to the number of events detected using the number of stochastic histograms, wherein the pulse train belongs to the signal.

5. The method of claim 2, wherein the step of generating, by the receiver, the number of stochastic histograms using the information generated comprises:
    accumulating the stochastic histogram in the number of stochastic histograms for the parameter in the number of parameters using the pulse information about the parameter for the pulses;
    detecting an event using an accumulation of the stochastic histogram in which the event corresponds to a number of pulses in the pulses; and
    extracting data points corresponding to the number of pulses from a number of bins in the stochastic histogram at which the event occurs.

6. The method of claim 5, wherein the step of generating, by the receiver, the number of stochastic histograms using the information generated comprises:
    accumulating another stochastic histogram in the number of stochastic histograms using the pulse information about another parameter in the number of parameters for the number of pulses corresponding to the event.

7. The method of claim 5, wherein the step of accumulating the stochastic histogram in the number of stochastic histograms for the parameter in the number of parameters using the pulse information about the parameter for the pulses comprises:
    accumulating a consecutive stochastic diffogram in the number of stochastic histograms for the parameter in the number of parameters using values for the parameter for the pulses, wherein the parameter is a pulse repetition interval.

8. The method of claim 2, wherein the step of detecting and classifying, by the receiver, the signal using the number of stochastic histograms comprises:
    identifying a pulse train using the number of stochastic histograms in which the pulse train comprises a sequence of pulses from the identified pulses and in which the pulse train belongs to the signal.

9. The method of claim 8, wherein the receiver system is a first receiver system, the receiver is a first receiver, and the pulse train is a first pulse train and wherein the method further comprises:
receiving a second pulse train identified by a second receiver in a second receiver system at the first receiver system; and
matching the first pulse train and the second pulse train within selected tolerances to cooperatively classify the first pulse train and the second pulse train using at least one of a parameter matching process, a pulse repetition interval matching process, a phase matching process, a geometric matching and filtering process, and a bias estimation process.

10. The method of claim 9, wherein the first pulse train is a first train group and the second pulse train is a second train group and wherein the step of matching the first pulse train and the second pulse train within the selected tolerances to cooperatively classify the first pulse train and the second pulse train using the phase matching process comprises:
creating a phase matrix using base pairs of pulse trains selected from the first train group and the second train group and lineup pairs of pulse trains selected from the first train group and the second train group; and
identifying which lineups of the base pairs of pulse trains and the lineup pairs of pulse trains have a matching figure of merit greater than a selected threshold.

11. The method of claim 1, wherein the receiver system is for a system selected from one of a global positioning system, a weather radar system, a radar system, a radio system, and a sonar system.

12. A receiver system comprising:
a transducer system configured to receive energy waves and convert the received energy waves into an electrical signal; and
a receiver configured to:
generate information using the electrical signal;
wherein the information is generated using pulses and pulse information comprising values for a number of parameters for the pulses, and wherein the information is generated using a complex ambiguity function to form a correlation with respect at least one of a differential time offset or a differential frequency offset between information generated and information received by another receiver, and wherein a repetitive portion of the signal carried in the energy waves is detected using the correlation;
generate a number of stochastic histograms using the information generated;
accumulate a circular stochastic histogram in the number of stochastic histograms for a parameter in the number of parameters using values for the parameter for the pulses;
wherein the parameter is a circular parameter selected from one of an angle of arrival, a phase difference of arrival, or a longitude; and
detect and classify the signal using the number of stochastic histograms and the parameter.

13. The receiver system of claim 12, wherein in being configured to generate the information using the electrical signal, the receiver system is configured to:

sample the electrical signal to generate samples of the electrical signal; and
identify the pulses and the pulse information about the pulses using the samples in which the pulse information includes values for the number of parameters for the pulses.

14. The receiver system of claim 13, wherein each stochastic histogram in the number of stochastic histograms is for the parameter in the number of parameters and wherein in being configured to generate the number of stochastic histograms using the information generated, the receiver is configured to:
accumulate a stochastic histogram in the number of stochastic histograms for the number of parameters for the pulses using the pulse information; and
detect a number of events using the stochastic histogram in the number of stochastic histograms in which each of the number of events is detected in a corresponding stochastic histogram in the number of stochastic histograms.

15. The receiver system of claim 14, wherein in being configured to detect and classify the signal using the number of stochastic histograms, the receiver is configured to identify a pulse train that corresponds to the number of events detected using the number of stochastic histograms.

16. The receiver system of claim 14, wherein in being configured to detect and classify the signal using the number of stochastic histograms, the receiver is configured to identify a pulse train using the number of stochastic histograms in which the pulse train comprises a sequence of pulses from the identified pulses and in which the pulse train belongs to the signal.

17. The receiver system of claim 13, wherein a stochastic histogram in the number of stochastic histograms is for a parameter in the number of parameters and wherein the receiver is further configured to:
accumulate the stochastic histogram in the number of stochastic histograms for the parameter in the number of parameters using the pulse information about the parameter for the pulses;
detect an event using an accumulation of the stochastic histogram in which the event corresponds to a number of pulses in the pulses; and
extract data points corresponding to the number of pulses from a number of bins in the stochastic histogram at which the event occurs.

18. The receiver system of claim 17, wherein the receiver is further configured to accumulate another stochastic histogram in the number of stochastic histograms using the pulse information about another parameter in the number of parameters for the number of pulses corresponding to the event.

19. The receiver system of claim 12, wherein the number of stochastic histograms includes at least one of a regular stochastic histogram, and a consecutive stochastic diffogram.

20. The receiver system of claim 12, wherein the receiver system is for a system selected from one of a global positioning system, a weather radar system, a radar system, a radio system, and a sonar system.

21. The receiver system of claim 12, wherein the receiver comprises a communications system configured to allow communications between the receiver and another receiver in another receiver system.

22. A cooperative classification system comprising:
a transducer system configured to receive energy waves and convert the received energy waves into an electrical signal; and
a receiver configured to:
  generate information using the electrical signal;
    wherein the information is generated using pulses and pulse information comprising values for a number of parameters for the pulses, and wherein the information is generated using a complex ambiguity function to form a correlation with respect at least one of a differential time offset or a differential frequency offset between information generated and information received by another receiver, and wherein a repetitive portion of the signal carried in the energy waves is detected using the correlation;
  generate a number of stochastic histograms using the information generated;
  accumulate a circular stochastic histogram in the number of stochastic histograms for a parameter in the number of parameters using values for the parameter for the pulses;
    wherein the parameter is a circular parameter selected from one of an angle of arrival, a phase difference of arrival, or a longitude; and
  detect and classify the signal using the number of stochastic histograms and the parameter; wherein in being configured to detect and classify the signal using the number of stochastic histograms, the receiver is configured to:
  identify a first pulse train;
  receive a second pulse train identified by a different receiver; and
  match the first pulse train and the second pulse train within selected tolerances.

23. The cooperative classification system of claim 22, wherein the receiver is configured to match the first pulse train and the second pulse train within the selected tolerances by using at least one of a parameter matching process, a pulse repetition interval matching process, a phase matching process, a geometric matching and filtering process, and a bias estimation process.

* * * * *